(12) United States Patent
Hayashi et al.

(10) Patent No.: US 11,349,123 B2
(45) Date of Patent: May 31, 2022

(54) AMORPHOUS OXIDE-BASED POSITIVE ELECTRODE ACTIVE MATERIAL, METHOD FOR PRODUCING SAME AND USE OF SAME

(71) Applicant: UNIVERSITY PUBLIC CORPORATION OSAKA, Osaka (JP)

(72) Inventors: Akitoshi Hayashi, Sakai (JP); Masahiro Tatsumisago, Sakai (JP)

(73) Assignee: UNIVERSITY PUBLIC CORPORATION OSAKA, Osaka (JP)

( * ) Notice: Subject to any disclaimer, the term of this patent is extended or adjusted under 35 U.S.C. 154(b) by 176 days.

(21) Appl. No.: 16/089,275

(22) PCT Filed: Mar. 8, 2017

(86) PCT No.: PCT/JP2017/009294
§ 371 (c)(1),
(2) Date: Sep. 27, 2018

(87) PCT Pub. No.: WO2017/169599
PCT Pub. Date: Oct. 5, 2017

(65) Prior Publication Data
US 2019/0181446 A1    Jun. 13, 2019

(30) Foreign Application Priority Data
Mar. 31, 2016 (JP) .............................. JP2016-070298

(51) Int. Cl.
| H01M 4/13 | (2010.01) |
| H01M 4/58 | (2010.01) |
| H01M 4/485 | (2010.01) |
| H01M 4/505 | (2010.01) |
| H01M 4/525 | (2010.01) |
| H01M 10/0562 | (2010.01) |
| H01M 4/1391 | (2010.01) |
| H01M 4/36 | (2006.01) |
| H01M 4/1397 | (2010.01) |
| H01M 4/136 | (2010.01) |
| H01M 4/131 | (2010.01) |
| H01M 10/052 | (2010.01) |
| H01M 10/0525 | (2010.01) |
| H01M 4/02 | (2006.01) |

(52) U.S. Cl.
CPC .............. *H01M 4/58* (2013.01); *H01M 4/131* (2013.01); *H01M 4/136* (2013.01); *H01M 4/1391* (2013.01); *H01M 4/1397* (2013.01); *H01M 4/364* (2013.01); *H01M 4/485* (2013.01); *H01M 4/505* (2013.01); *H01M 4/525* (2013.01); *H01M 4/582* (2013.01); *H01M 4/5825* (2013.01); *H01M 10/0562* (2013.01); *H01M 10/052* (2013.01); *H01M 10/0525* (2013.01); *H01M 2004/028* (2013.01); *H01M 2300/0071* (2013.01)

(58) Field of Classification Search
CPC ........ H01M 4/58; H01M 4/131; H01M 4/136; H01M 4/1391; H01M 4/1397; H01M 4/364; H01M 4/485; H01M 4/505; H01M 4/525; H01M 4/582; H01M 4/5825; H01M 10/0562; H01M 10/052; H01M 10/0525; H01M 2004/028; H01M 2300/0071
See application file for complete search history.

(56) References Cited

U.S. PATENT DOCUMENTS

| 2013/0244109 A1 | 9/2013 | Sabi et al. |
| 2017/0005337 A1 | 1/2017 | Ikejiri et al. |

FOREIGN PATENT DOCUMENTS

| JP | 2010-177024 A | | 8/2010 |
| JP | 2010177024 A | * | 8/2010 |
| JP | 2013-161646 A | | 8/2013 |
| JP | 2015-176854 A | | 10/2015 |

OTHER PUBLICATIONS

European Patent Office, Extended European Search Report issued in corresponding Application No. EP 17774144, dated Jul. 24, 2019.
Sabi, et al. "A new class of amorphous cathode active material LixMyPOz (M=Ni, Cu, Co, Mn, Au, Ag, Pd)." Journal of Power Sources, 258 (2014), p. 54-60 (See: citation in the specification of the present application).
Japan Patent Office, International Search Report issued in International Stage of the present application, PCT Application No. PCT/JP2017/009294, dated May 23, 2017.
Japan Patent Office, Written Opinion issued in the International Stage of the present application, PCT Application No. PCT/JP2017/009294, dated May 23, 2017 (English language translation not available).

* cited by examiner

*Primary Examiner* — Raymond Alejandro
(74) *Attorney, Agent, or Firm* — Stites & Harbison, PLLC; Terry L. Wright

(57) ABSTRACT

An amorphous oxide-based positive electrode active material that is a production material of a positive electrode for an all-solid secondary battery, wherein the amorphous oxide-based positive electrode active material (i) comprises an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom (except for the oxygen atom constituting the ionic species); (ii) contains at least an amorphous phase; and (iii) is a production material of a positive electrode with a thickness of 20 μm or more.

10 Claims, 18 Drawing Sheets

Co Kα1

S Kα1

AMORPHOUS OXIDE-BASED POSITIVE ELECTRODE ACTIVE MATERIAL, METHOD FOR PRODUCING SAME AND USE OF SAME

TECHNICAL FIELD

The present invention relates to an amorphous oxide-based positive electrode active material, a method for producing the same and use thereof. More specifically, the present invention relates to an amorphous oxide-based positive electrode active material that can exhibit high conductivity even in a relatively thick positive electrode, a method for producing the same, a positive electrode and an all-solid secondary battery containing the same.

BACKGROUND ART

Lithium ion secondary batteries have high voltage and high capacity, and thus have been widely used as power supplies of mobile phones, digital cameras, camcorders, notebook computers, electric vehicles, and so on. The lithium secondary batteries, which are commonly circulated, use a liquid electrolyte in which an electrolytic salt as an electrolyte is dissolved in a non-aqueous solvent. Since many non-aqueous solvents are flammable, there have been demands to secure safety of the lithium secondary batteries.

For the purpose of securing safety, all-solid secondary batteries have been proposed that use, instead of the non-aqueous solvent, a so-called solid electrolyte made of solid materials. Many of the solid materials reported are sulfide-based solid electrolytes represented by $Li_2S$—$P_2S_5$. However, because the production materials of sulfide-based solid electrolytes are sulfides, there has been a challenge from viewpoints of workability. Accordingly, the applicant of the present application proposed an oxide-based solid electrolyte that is not a sulfide-based solid electrolyte (Japanese Unexamined Patent Application Publication No. 2015-76854: Patent Literature 1).

Oxide-based solid electrolytes, when, for example, solid electrolyte layers are formed therefrom, are required to be sintered. It is known that if a solid electrolyte is sintered with a positive electrode and a negative electrode at an extremely high sintering temperature, highly resistive phases are formed at interfaces between the electrodes and the electrolyte. In Patent Literature 1, the sintering temperature can be low, and as a result, formation of a highly resistive phase can be suppressed.

Meanwhile, an all-solid secondary battery contains, as requisite components other than a solid electrolyte layer, a positive electrode and a negative electrode. In Examples of Patent Literature 1, $LiCoO_2$ is used as a positive electrode active material that forms a positive electrode. LixMyPOz has been proposed as an electron conductive positive electrode active material that prevents formation of highly resistive phases at the interfaces described above (Sabi et al., Journal of Power Sources, 258 (2014), p. 54-60: Non-Patent Literature 1). Non-Patent Literature 1 proposes formation of a positive electrode containing a positive electrode active material on a solid electrolyte layer by sputtering, and describes that the heat applied to the solid electrolyte layer during the formation can be reduced, thereby suppressing formation of highly resistive phases.

CITATION LIST

Patent Literature

Patent Literature 1: Japanese Unexamined Patent Application Publication No. 2015-76854

Non-Patent Literature

Non-Patent Literature 1: Sabi et al., Journal of Power Sources, 258 (2014), p. 54-60

SUMMARY OF INVENTION

Technical Problems

In the above patent publication, because the positive electrode is formed by sputtering, a thick positive electrode could not be formed. Because the thickness of the positive electrode affects the capacity of the all-solid secondary battery, it is required to increase the thickness as much as possible. It is also desired to provide a positive electrode active material that can prevent formation of highly resistive phases at the interfaces with the solid electrolyte layer.

Solution to Problems

Accordingly, the present invention provides an amorphous oxide-based positive electrode active material that is a production material of a positive electrode for an all-solid secondary battery, wherein:
the amorphous oxide-based positive electrode active material
(i) contains an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom (except for the oxygen atom constituting the ionic species);
(ii) contains at least an amorphous phase; and
(iii) is a production material of a positive electrode with a thickness of 20 μm or more.

The present invention further provides a method for producing the amorphous oxide-based positive electrode active material, wherein the amorphous oxide-based positive electrode active material is obtained by mixing raw materials thereof by mechanical milling.

The present invention also provides a positive electrode with a thickness of 20 μm or more, containing the amorphous oxide-based positive electrode active material.

The present invention further provides an all-solid secondary battery containing at least the positive electrode, a negative electrode and a solid electrolyte layer positioned between the positive electrode and the negative electrode.

Advantageous Effects of Invention

According to the present invention, an amorphous oxide-based positive electrode active material that can exhibit high conductivity even in a relatively thick positive electrode can be provided.

In addition, the present invention can provide an amorphous oxide-based positive electrode active material that can exhibit higher conductivity even in a relatively thick positive electrode when any of the following conditions are met.

(1) The amorphous oxide-based positive electrode active material contains an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom (except for the oxygen atom constituting the ionic species); is in an amorphous state; and is a production material of a positive electrode with a thickness of 20 µm or more for an all-solid secondary battery.

(2) The amorphous oxide-based positive electrode active material exhibits such an amorphous state that a peak at minimum 2θ in an XRD pattern has a half-value width of 0.5 or more.

(3) The amorphous oxide-based positive electrode active material contains an amorphous phase and a crystalline phase.

(4) The amorphous oxide-based positive electrode active material contains components derived from an alkali metal oxide and an alkali metal salt, the alkali metal oxide is selected from the group consisting of lithium-based compounds of $LiCoO_2$, $LiNiO_2$, $LiMnO_2$, $Li_2MnO_3$, $Li(Ni, Co, Mn)O_2$, $Li_2TiO_3$, $LiFeO_2$, $LiCrO_2$, $Li_2CuO_2$, $LiCuO_2$, $LiMoO_2$, $Li_2RuO_3$, $Li_3NbO_4$, $Li_3V_2(PO_4)_3$, $LiMn_2O_4$ and $Li(Ni, Mn)O_4$ and sodium-based compounds of $NaCoO_2$, $NaNiO_2$, $NaMnO_2$, $Na_2MnO_3$, $Na(Ni, Co, Mn)O_2$, $NaFeO_2$, $Na_2TiO_3$, $NaCrO_2$, $Na_2CuO_2$, $NaCuO_2$, $NaMoO_2$, $Na_2RuO_3$, $Na_3NbO_4$, $Na_3V_2(PO_4)_3$, $NaMn_2O_4$ and $Na(Ni, Mn)O_4$, and the alkali metal salt is selected from $A_xB_yO_z$ (wherein A is Li or Na; B is selected from P, S, B, C, Si, Al, Ge and N; x is 1 or more; y is 1 or more; z is 1 or more; and x, y and z are stoichiometrically possible values) and AX (wherein A is Li or Na; and X is selected from F, Cl, Br and I).

(5) the component derived from the alkali metal oxide and the component derived from the alkali metal salt exist in the amorphous oxide-based positive electrode active material at a molar ratio of 1:9 to 9:1.

(6) The amorphous oxide-based positive electrode active material contains components derived from $LiCoO_2$ and $Li_3PO_4$ and/or $Li_2SO_4$.

DESCRIPTION OF EMBODIMENTS

Amorphous Oxide-Based Positive Electrode Active Material

Figure 1:
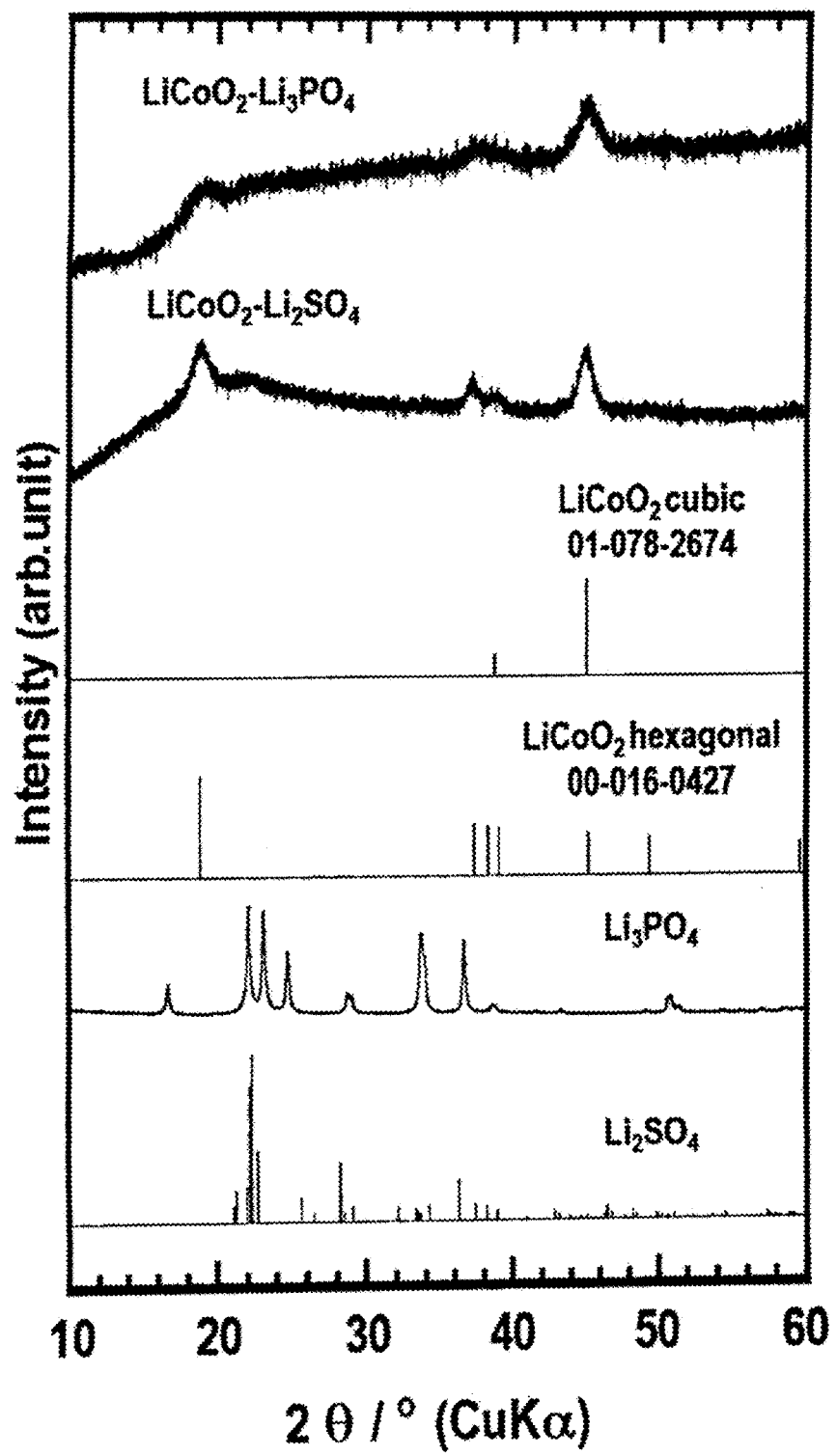
FIG. 1 indicates XRD patterns of a positive electrode active material of Example 1.

The amorphous oxide-based positive electrode active material (hereinafter merely referred to as "positive electrode active material") contains an alkali metal selected from Li and Na, a second metal selected from Co, Ni, Mn, Fe, Cr, V, Cu, Ti, Zn, Zr, Nb, Mo, Ru and Sn, an ionic species selected from phosphate ion, sulfate ion, borate ion, silicate ion, aluminate ion, germanate ion, nitrate ion, carbonate ion and halide ion and an oxygen atom (except for the oxygen atom constituting the ionic species).

It is preferable that the positive electrode active material contains components derived from an alkali metal oxide and an alkali metal salt, the alkali metal oxide is selected from the group consisting of lithium-based compounds of $LiCoO_2$, $LiNiO_2$, $LiMnO_2$, $Li_2MnO_3$, $Li(Ni, Co, Mn)O_2$, $Li_2TiO_3$, $LiFeO_2$, $LiCrO_2$, $Li_2CuO_2$, $LiCuO_2$, $LiMoO_2$, $Li_2RuO_3$, $Li_3NbO_4$, $Li_3V_2(PO_4)_3$, $LiMn_2O_4$ and $Li(Ni, Mn)O_4$ and sodium-based compounds of $NaCoO_2$, $NaNiO_2$, $NaMnO_2$, $Na_2MnO_3$, $Na(Ni, Co, Mn)O_2$, $NaFeO_2$, $NaCrO_2$, $Na_2CuO_2$, $NaCuO_2$, $NaMoO_2$, $Na_2RuO_3$, $Na_3NbO_4$, $Na_3V_2(PO_4)_3$, $NaMn_2O_4$ and $Na(Ni, Mn)O_4$, and the alkali metal salt is selected from $A_xB_yO_z$ (wherein A is Li or Na; B is selected from P, S, B, C, Si, Al, Ge and N; x is 1 or more; y is 1 or more; z is 1 or more; and x, y and z are stoichiometrically possible values) and AX (wherein A is Li or Na; and X is selected from F, Cl, Br and I). The alkali metal oxide and the alkali metal salt selected may respectively be one type of compound or more than one compound.

More specifically, it is preferable that the alkali metal salt is selected from the group consisting of lithium salts of $Li_3PO_4$, $Li_4P_2O_7$, $LiPO_3$, $Li_2SO_4$, $Li_3BO_3$, $Li_4BO_5$, $LiBO_2$, $Li_2CO_3$, $Li_4SiO_4$, $Li_6Si_2O_7$, $Li_2SiO_3$, $Li_3AlO_3$, $Li_4Al_2O_5$, $LiAlO_2$, $Li_4GeO_4$, $Li_6Ge_2O_7$, $Li_2GeO_3$, $LiNO_3$ and LiX (X=F, Cl, Br, I) and sodium salts of $Na_3PO_4$, $Na_2SO_4$, $Na_3BO_3$, $Na_2CO_3$, $Na_4SiO_4$, $Na_3AlO_3$, $Na_4GeO_4$, $NaNO_3$ and NaX (X=F, Cl, Br, I).

Among the above specific examples, it is preferable that the positive electrode active material contains components derived from $LiCoO_2$ and $Li_3PO_4$ and/or $Li_2SO_4$. It is believed that an alkali metal salt having a relatively low melting point such as $LiNO_3$ easily follows an increase or decrease of the positive electrode volume due to charge and discharge reaction, and can prevent generation of irreversible capacity. When $LiNO_3$ is used in combination with $Li_3PO_4$ and/or $Li_2SO_4$, the positive electrode active material may contain 5 to 20% by mole of $LiNO_3$.

The positive electrode active material may further contain an oxide of a metal selected from Co, Ni, Mn, Fe, Cr, V, Cu, Ti, Zn, Zr, Nb, Mo, Ru and Sn. Inclusion of a metal oxide may increase the battery capacity. For example, it is believed that $TiO_2$ and $Mn_2O_3$ act to improve the reactivity of redox reaction, thereby exhibiting an improvement of the battery capacity. The metal oxide may be used at a molar ratio of 0.01 to 3 per 1 mole of the alkali metal oxide.

It is preferable that the component derived from the alkali metal oxide and the component derived from the alkali metal salt exist in the positive electrode active material at a molar ratio of 1:9 to 9:1. When the molar ratio of the component derived from the alkali metal salt is less than 1, it may be difficult to obtain amorphous positive electrode active material. When the molar ratio is more than 9, the function of the electrode may not be exhibited. The molar ratio may be 1:9, 2:8, 3:7, 4:6, 5:5, 6:4, 7:3, 8:2 or 9:1. The molar ratio is more preferably 3:7 to 9:1 and still more preferably 5:5 to 8:2.

The positive electrode active material may contain, as far as the positive electrode active material contains an amorphous phase, a crystalline phase within the range that does not inhibit the effect of the present invention. The crystal state containing an amorphous phase as a requisite phase and optionally containing a crystalline phase is referred to as an amorphous state. When the crystallinity is high, the resistance tends to be high because the formation of an interface becomes difficult, and thus it is desired to provide a positive electrode active material having low crystallinity (amorphous state). In the amorphous state, the density is lower than the crystalline state, and thus the positive electrode active material has high volume following capability during charge and discharge. As a result, generation of irreversible capacity such as a nonconductive part due to formation of powder may be prevented. The amorphous state as used herein is a state that may prevent generation of irreversible capacity and means to indicate a state, for example, in which a peak at minimum 2θ in an XRD pattern has a half-value width of 0.5 or more. The half-value width may be 0.5, 0.6, 0.7, 0.8, 0.9, 1.0, 1.1, 1.2, 1.3, 1.4, 1.5, 1.6, 1.7, 1.8, 1.9, 2.0, 2.5, 3.0, 3.5, 4.0, 4.5 or 5.0.

The inventors of the present invention found that the positive electrode active material may suitably contain a small amount of crystalline phase. A thick positive electrode is generally formed by pressing raw materials (material particles) in the form of particles such as a positive electrode active material. It is strongly desired to decrease, in a thick positive electrode, gaps (spaces) between material particles as much as possible and increase adhesiveness between the material particles from viewpoints of improving the battery properties. Material particles formed from a positive electrode active material containing a small amount of crystalline phase are easily crushed by pressing, and thus may improve adhesiveness between the material particles. The positive electrode active material may contain a crystalline phase at such an extent that the half-value width exhibited is 5.0 or less, 4.0 or less, 3.0 or less, 2.0 or less or 1.0 or less.

Further, a positive electrode with a thickness of 20 μm or more may be easily formed by pressing with the positive electrode active material, and thus the positive electrode active material is a suitable material for formation of a positive electrode for a bulk-type all-solid secondary battery having high capacity. The thickness of 20 μm or more is difficult to achieve by vapor deposition such as sputtering. The thickness may be 20 μm, 25 μm, 30 μm, 35 μm, 40 μm, 50 μm, 60 μm, 80 μm, 100 μm, 120 μm, 140 μm or 150 μm.

Production Method of Positive Electrode Active Material

The positive electrode active material may be produced by mixing raw materials thereof by mechanical milling. Particularly, it is predicted that $Li_2SO_4$ may be decomposed by sputtering as in Non-Patent Literature 1 and it is difficult to form a positive electrodes from the positive electrode active material. Therefore, for $Li_2SO_4$, production by mechanical milling is advantageous.

The treatment device and treatment conditions of mechanical milling are not particularly limited as far as the device and conditions allow sufficient mixing of raw materials to form a positive electrode active material in an amorphous state.

The treatment device used may be generally a ball mill. A ball mill is preferable because high mechanical energy may be obtained. Among ball mills, a planetary ball mill is preferable because high collision energy may be effectively generated due to rotation of pots as well as revolution of a disk.

The treatment conditions may be appropriately set according to the treatment device used. When, for example, a ball mill is used, raw materials may be uniformly mixed when the rotation speed is high and/or the treatment time is long. Specifically, when a planetary ball mill is used, the conditions may be the rotation speed of 50 to 600 rounds per minute, the treatment time of 0.1 to 200 hours and 1 to 100 kWh/kg-raw material mixture. The treatment atmosphere is preferably an inert atmosphere such as argon. The treatment time is more preferably 10 to 70 hours in order to achieve a more suitable amorphous state.

The raw materials are preferably in anhydrous state from viewpoints of avoiding hydrolysis reaction during mechanical milling. When the raw materials contain crystalline water, it is preferable to subject the raw materials to heat treatment beforehand in an air for about 2 hours. The temperature of the heat treatment may be appropriately decided according to the type of raw materials. The alkali metal salt may be obtained by reaction of a hydroxide of lithium and/or sodium and a corresponding acid.

Positive Electrode

The positive electrode contains at least the positive electrode active material. The positive electrode also has a thickness of 20 μm or more. It is difficult to form a positive electrode with a thickness of 20 μm or more by sputtering.

The positive electrode may optionally contain an oxide-based solid electrolyte. The oxide-based solid electrolyte accounts for 30% by weight or less and more preferably 10% by weight or less in the positive electrode.

Examples of the oxide-based solid electrolyte include lithium salts such as $Li_3PO_4$, $Li_2SO_4$, $Li_3BO_3$ and $Li_2CO_3$ and sodium salts such as $Na_3PO_4$, $Na_2SO_4$, $Na_3BO_3$ and $Na_2CO_3$. The oxide-based solid electrolyte may impart sufficient conductivity to the positive electrode even after heating at about 300° C. or lower.

The oxide-based solid electrolyte may be glass ceramic-like or glass-like. For example, for a solid electrolyte represented by $b-1(Li_3BO_3)/b(Li_2SO_4)$, the glass ceramic-like electrolyte tends to have higher conductivity when b is small and lower conductivity when b is large than a glass-like electrolyte. The glass ceramic-like electrolyte is generally obtained by heating a glass-like electrolyte at or above a crystallization temperature. Therefore, a glass ceramic-like electrolyte costs more than a glass-like electrolyte. Therefore, the electrolyte may be selected from the above electrolytes according to the performance and price of the desired all-solid battery.

It is preferable that "glass ceramic-like" is such a state that a glass transition point that is present in the corresponding glass-like state does not exist any more. The glass ceramic-like may be such a state that crystalline portions are dispersed in a glass component in an amorphous state. The proportion of the crystalline portions is preferably 50% by weight or more and more preferably 80% by weight or more relative to the whole. The proportion of the crystalline portions may be measured by solid NMR.

(1) The glass-like oxide-based solid electrolyte may be obtained by mixing alkali metal salts. From viewpoints of more uniformly mixing the salts, it is preferable to use the mechanical milling under the same conditions for the mixing as the positive electrode active material above.

(2) The glass ceramic-like oxide-based solid electrolyte may be obtained by subjecting the glass-like solid electrolyte to heat treatment. It is preferable that the heat treatment is conducted at or above a crystallization temperature of the glass-like solid electrolyte.

The glass transition temperature (Tg) may vary according to the constituent elements of the solid electrolyte. For example, a solid electrolyte containing $Li_3BO_3$—$Li_2SO_4$ has a glass transition temperature in the range of 190 to 250° C. and a first crystallization temperature (Tc) in the range of 210 to 270° C. The upper limit of the heat treatment temperature is not particularly limited and is generally the first crystallization temperature+100° C.

The heat treatment time is a period during which a glass-like electrolyte may be transformed to a glass ceramic-like electrolyte, and is short when the heat treatment temperature is high and is long when the heat treatment temperature is low. The heat treatment temperature is generally in the range of 0.1 to 10 hours.

The positive electrode may further contain a binder, a conductive agent and the like mixed therein.

Examples of the binder include polyvinylidene fluoride, polytetrafluoroethylene, polyvinyl alcohol, polyvinyl acetate, poly(methyl methacrylate), polyethylene and the like.

Examples of the conductive agent include natural graphite, artificial graphite, acetylene black, ketjen black, Denka black, carbon The positive electrode may be formed on a collector such as SUS, aluminum or copper.

The positive electrode may be obtained in the form of pellets by, for example, mixing the positive electrode active material and optionally an oxide-based solid electrolyte, a binder, a conductive agent and the like and pressing the obtained mixture. Pressing may be conducted at a temperature of at or below 300° C. and pressure of 100 to 800 MPa for 0.1 to 5 hours. The positive electrode active material of the present invention may impart high conductivity to a positive electrode even at a pressing temperature that is lower than the conventional temperature.

The pressing may be combined with pressing during formation of a solid electrolyte layer. By combining, adhesiveness at the interface between the positive electrode and the solid electrolyte layer may be further improved.

All-Solid Secondary Battery

The all-solid secondary battery contains at least a positive electrode, a negative electrode and a solid electrolyte layer positioned between the positive electrode and the negative electrode. The positive electrode may be the one described above. The solid electrolyte layer may contain the solid electrolyte described in the section of the positive electrode.

The negative electrode is not particularly limited. The negative electrode may only consist of a negative electrode active material or contain a negative electrode active material mixed with a binder, a conductive agent, an electrolyte and the like.

Examples of the negative electrode active material include metals such as Li, Na, In and Sn, Li alloy, Na alloy, graphite, hard carbon and various transition metal oxides such as $Li_{4/3}Ti_{5/3}O_4$, $Na_3V_2(PO_4)_3$ and SnO.

The binder and the conductive agent may be any of those mentioned in the section of the positive electrode. The electrolyte may be any of oxide-based and sulfide-based solid electrolytes.

The negative electrode may be obtained in the form of pellets by, for example, mixing the negative electrode active material and optionally a binder, a conductive agent, an electrolyte and the like and pressing the obtained mixture. When the negative electrode active material is a metal sheet (foil) of a metal or an alloy thereof, the sheet may be directly used.

The negative electrode may be formed on a collector such as SUS, aluminum or copper.

Production Method of All-Solid Secondary Battery

The all-solid secondary battery may be obtained by, for example, stacking the positive electrode, an electrolyte layer and a negative electrode and pressing the same.

EXAMPLES

The present invention is further specifically described by way of Examples which do not limit the present invention.

Example 1

Two types of positive electrode active materials were produced by the procedure described below from raw materials of $LiCoO_2$ and $Li_3PO_4$ or $Li_2SO_4$. The two types of positive electrode active materials are hereinafter referred to as $LiCoO_2$—$Li_3PO_4$ and $LiCoO_2$—$Li_2SO_4$, respectively. $LiCoO_2$ (produced by Nippon Chemical Industrial Co., Ltd.) and $Li_3PO_4$ (produced by Wako Pure Chemical Industries, Ltd.) or $Li_2SO_4$ obtained by dehydration of $Li_2SO_4.H_2O$ (produced by Wako Pure Chemical Industries, Ltd.) by heating in an Ar atmosphere at 300° C. for 3 hours were weighed so as to be in the molar ratio of 7:3 and mixed in a mortar. The obtained mixtures were subjected to mechanical milling to obtain two types of positive electrode active materials having a particle diameter of about 3 μm. For this procedure, a planetary ball mill, Pulverisette P-7 produced by Fritsch GmbH, was used in which a pot and balls were made of $ZrO_2$ and the 45-ml pot contained 500 balls (40 g) respectively with a diameter of 5 mm. The mechanical milling was conducted at a rotation speed of 370 rpm at room temperature in an argon atmosphere for 20 hours.

The above production method is according to the description in Experimental in Akitoshi Hayashi et al., Journal of Non-Crystalline Solids 356 (2010), p. 2670-2673.

The positive electrode active material (80 mg) was pressed (pressure: 360 MPa) at room temperature (about 25° C.) for 0.1 hours to obtain pellets with a diameter of 10 mm and a thickness of about 1 mm.

FIG. 1 indicates XRD patterns of the obtained pellets of two types of positive electrode active materials. FIG. 1 also indicates XRD patterns of cubic $LiCoO_2$, hexagonal $LiCoO_2$, $Li_3PO_4$ and $Li_2SO_4$. It is found from FIG. 1 that the peaks corresponding to $LiCoO_2$ are broadened and thus the positive electrode active materials are in an amorphous state. Particularly, it is found that all 2θ peaks observed have half-value widths of 0.5 or more.

Figure 2:
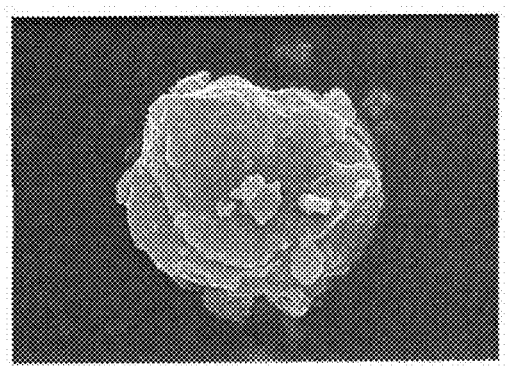
FIG. 2 indicates SEM and EDX maps of a positive electrode active material of Example 1.
Figure 2:
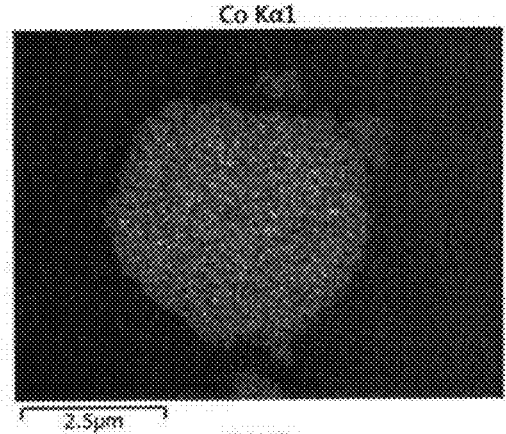
Figure 2:
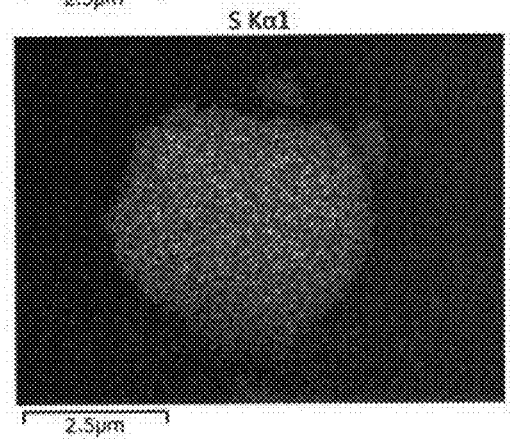

FIG. 2(a) indicates images of the $LiCoO_2$—$Li_2SO_4$ positive electrode active material obtained by scanning electron microscopy (SEM) and FIGS. 2(b) and (c) indicate energy dispersive X-ray spectroscopy (EDX) maps of Co and S atoms corresponding to FIG. 2(a). It is found from FIGS. 2(a) to (c) that Co and S are uniformly dispersed in particles of the obtained positive electrode active material. This indicates that reaction of original particles of $LiCoO_2$ and $Li_2SO_4$ formed new particles of $LiCoO_2$—$Li_2SO_4$.

Figure 3:
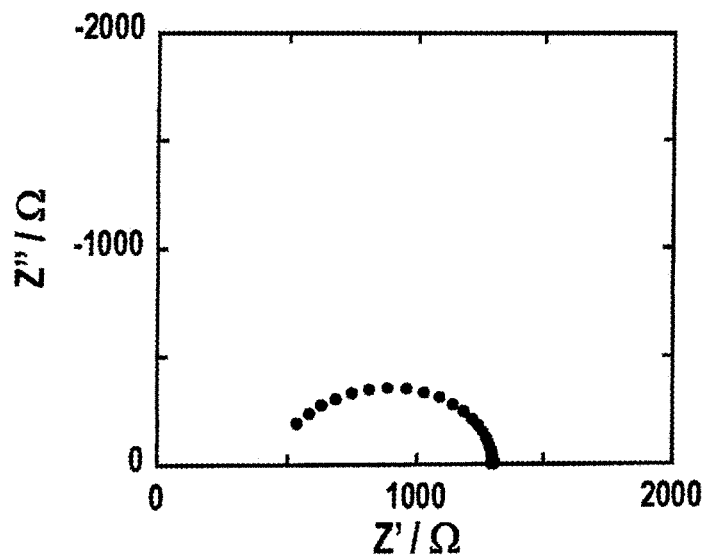
FIG. 3 indicates an impedance plot of a positive electrode active material of Example 1.
Figure 4:
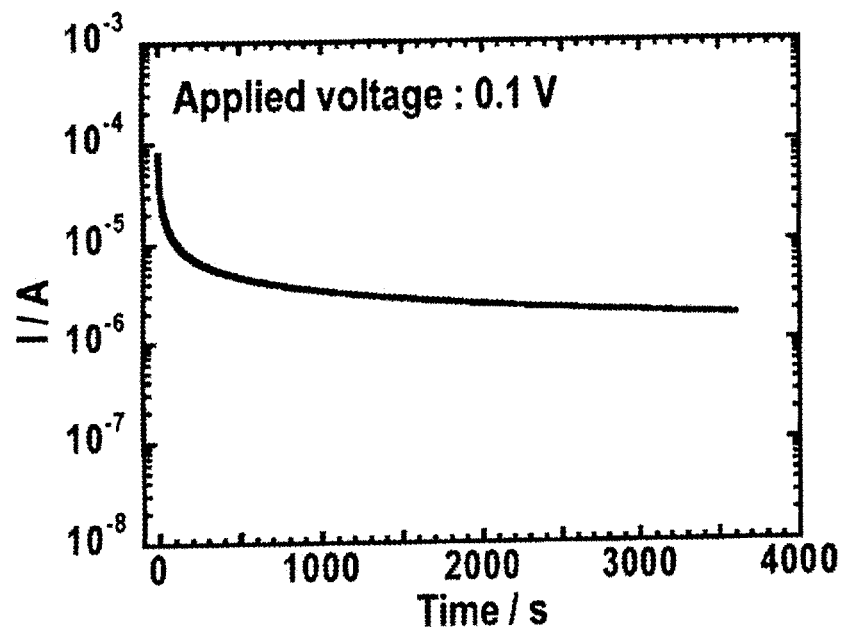
FIG. 4 indicates a discharge current decrease over time of a positive electrode active material of Example 1.

FIG. 3 indicates a Nyquist plot of the $LiCoO_2$—$Li_2SO_4$ positive electrode active material according to the alternating current impedance method and FIG. 4 indicates a current behavior over time during direct current polarization measurement with an applied voltage of 0.1 V. FIG. 3 means the result of measurement while the positive electrode active material was sandwiched between SUS plates, and FIG. 4 means the result of measurement while the positive electrode active material was sandwiched between solid electrolyte layers ($Li_3PS_4$) and further between Li plates. It is found from FIGS. 3 and 4 that $LiCoO_2$—$Li_2SO_4$ has an electron conductivity of $3.7 \times 10^{-5}$ Scm$^{-1}$ and a lithium ion conductivity of $1.2 \times 10^{-6}$ Scm$^{-1}$. Similarly, it is found that $LiCoO_2$—$Li_2PO_4$ has an electron conductivity of $2.5 \times 10^{-5}$ Scm$^{-1}$ and a lithium ion conductivity of $5.3 \times 10^{-7}$ Scm$^{-1}$. Because the electron conductivity and the ion conductivity at room temperature are $10^{-7}$ Scm$^{-1}$ or more, the positive electrode active materials fulfil the requirement as positive electrodes for all-solid batteries.

The solid electrolyte layer was prepared according to the procedure below.

$LiOH \cdot H_2O$ (produced by Wako Pure Chemical Industries, Ltd.) and $H_3BO_3$ (produced by Wako Pure Chemical Industries, Ltd.) were mixed, heated at 500° C. for 1 hour and sintered at 600° C. for 2 hours to synthesize $Li_3BO_3$. $Li_2SO_4 \cdot H_2O$ (produced by Wako Pure Chemical Industries, Ltd.) was dehydrated by heating in an Ar atmosphere at 300° C. for 3 hours to obtain $Li_2SO_4$. $Li_3BO_3$, $Li_2SO_4$ and $Li_2CO_3$ (produced by Wako Pure Chemical Industries, Ltd.) were weighed so as to be a molar ratio of 1:1:1 and mixed in a mortar, and the mixture was placed in a planetary ball mill. After mechanical milling, glass-like solid electrolyte ($33Li_3BO_3 \cdot 33Li_2SO_4 \cdot 33Li_2CO_3$) having a particle diameter of a few μm was obtained. The planetary ball mill used was Pulverisette P-7 produced by Fritsch GmbH in which a pot and balls were made of zirconium oxide and the 45-ml pot contained 160 balls respectively with a diameter of 5 mm. The mechanical milling was conducted at a rotation speed of 370 rpm at room temperature in a globe box of a dry Ar atmosphere for 90 hours. The glass-like solid electrolyte was heated at 260° C. which was at or above a crystallization temperature, to transform to glass ceramic and obtain a glass ceramic-like solid electrolyte. The obtained solid electrolyte (40 mg) was subjected to pressing at pressure of 720 MPa on a pellet molding machine having a molding unit with an area of 0.785 cm$^2$ to obtain a solid electrolyte layer (thickness: about 1 mm) in the form of pellets.

Example 2

Figure 5:
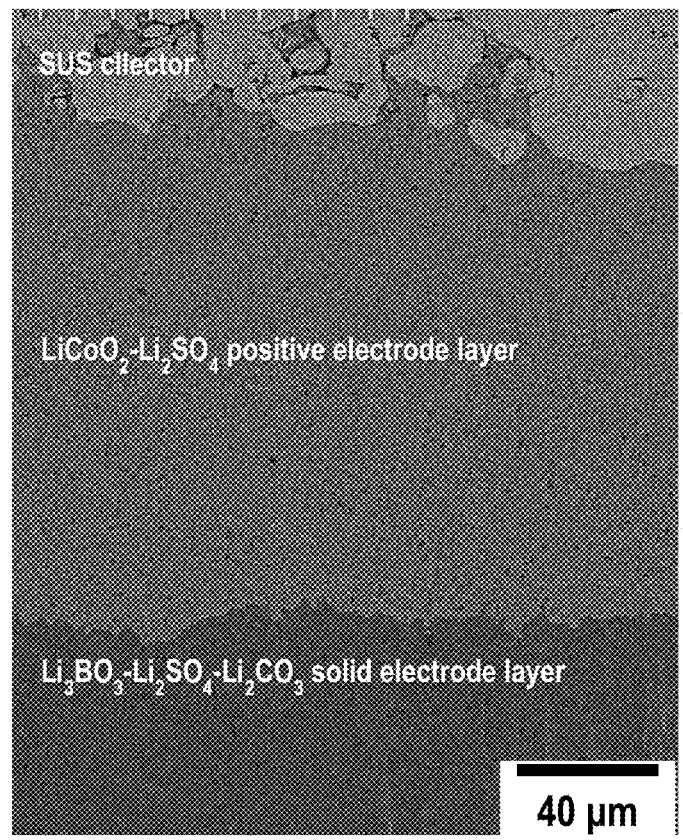
FIG. 5 indicates sectional images of a cell of Example 2.
Figure 6:
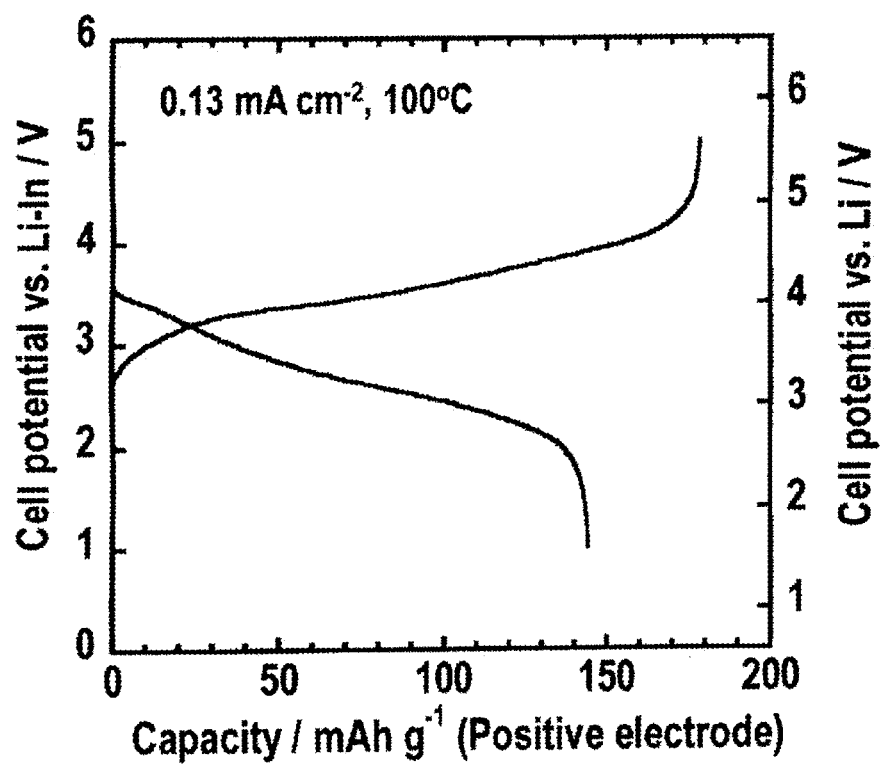
FIG. 6 indicates a graph indicating the result of the charge-discharge test of a cell of Example 2.

The positive electrode ($LiCoO_2$—$Li_2SO_4$), the solid electrolyte layer and an indium foil as a counter electrode were stacked in this order and the stacked article was sandwiched between collectors made of stainless steel (SUS) to obtain a battery cell (all-solid lithium secondary battery). FIG. 5 indicates sectional images of the cell. The cell was subjected to a charge-discharge test at 100° C. and a current density of 0.13 mAcm$^{-2}$. The test result is indicated in the graph in FIG. 6. In FIG. 6, the left vertical axis indicates a potential relative to the Li—In counter electrode and the right vertical axis indicates a potential based on Li that was calculated by taking the potential difference between Li—In and Li which was 0.62 V into account.

From FIG. 5, the positive electrode and the solid electrolyte layer were closely adhered at the interface without any gap, and the presence of a side reaction layer (highly resistive layer) was not observed at the interface. It is found that the positive electrode layer has a thickness of about 100 μm. It is found from FIG. 6 that charge and discharge are feasible even with a so-called bulk-type all-solid secondary battery formed by pressing.

Figure 7:
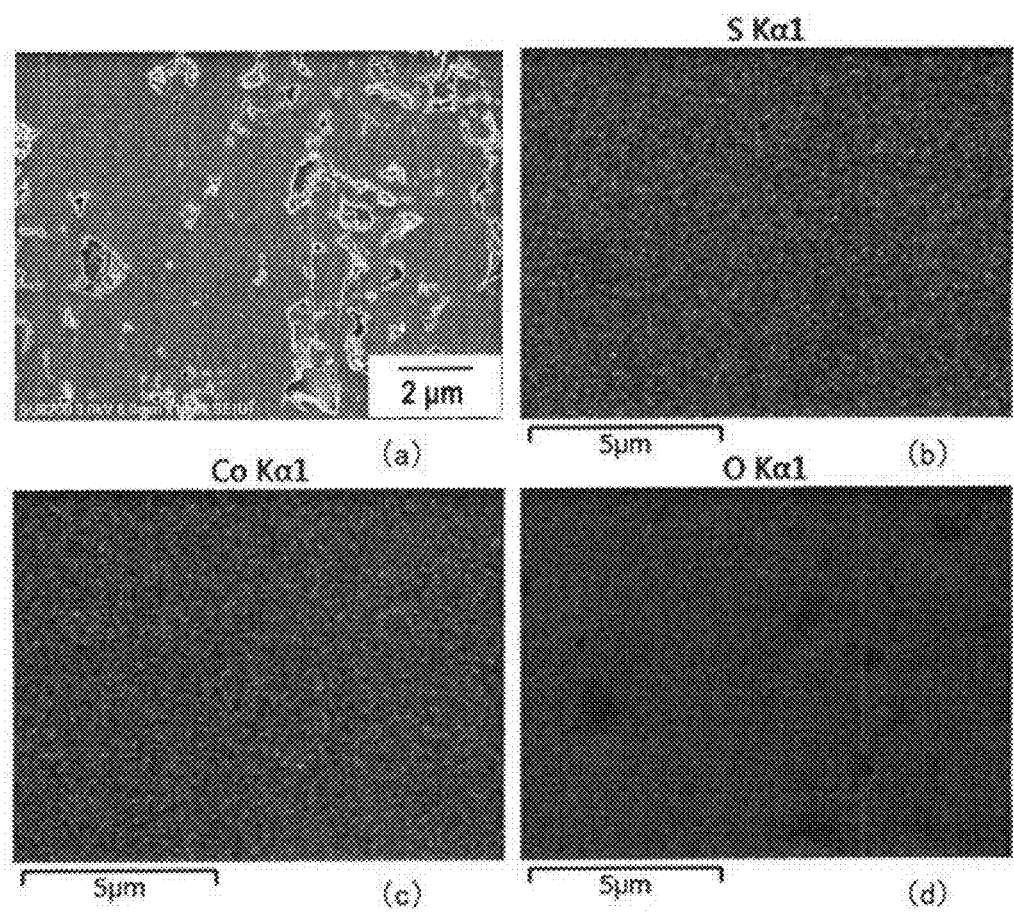
FIG. 7 indicates sectional SEM images of a positive electrode of a cell of Example 2.

FIG. 7(a) indicates a sectional SEM image of the positive electrode, and FIGS. 7(b) to (d) indicate EDX maps of S, Co and O atoms corresponding to FIG. 7(a). It is found from FIGS. 7(a) to (d) that Co and S are uniformly dispersed in the obtained positive electrode active material.

Figure 8:
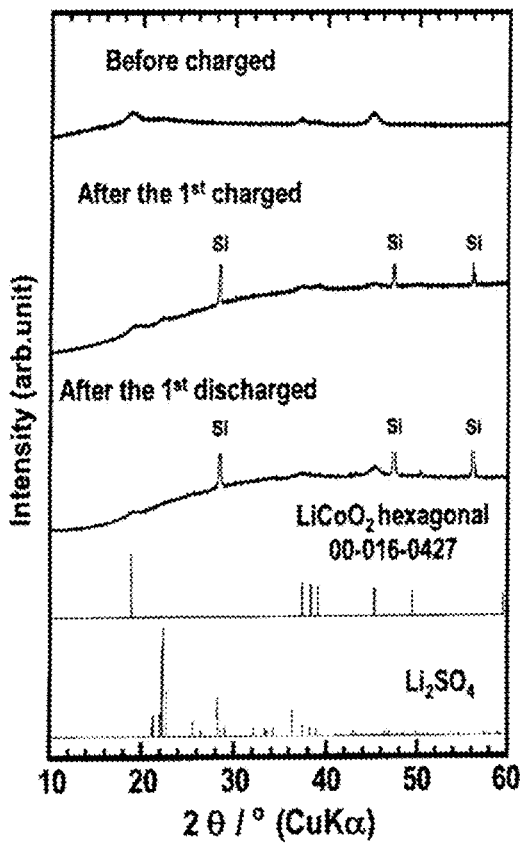
FIG. 8 indicates XRD patterns of pellets of a positive electrode of a cell of Example 2 before and after charge and after discharge.

Further, FIG. 8 indicates XRD patterns of the pellets of the positive electrode before and after charge and after discharge. FIG. 8 also indicates XRD patterns of hexagonal $LiCoO_2$ and $Li_2SO_4$. The peaks labelled with Si in FIG. 8 mean peaks of a standard material. It is found from FIG. 8 that the positive electrode active material is in an amorphous state even after charge and after discharge.

Example 3

Figure 9:
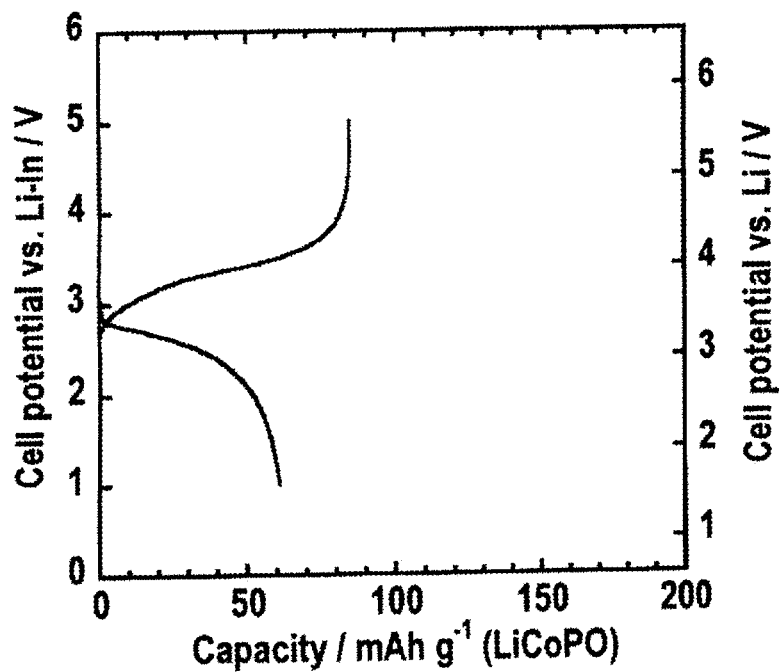
FIG. 9 indicates a graph indicating the result of the charge-discharge test of a cell of Example 3.

A battery cell was prepared in the same manner as in Example 2 except that $LiCoO_2$—$Li_2SO_4$ was replaced by $LiCoO_2$—$Li_2PO_4$, and was subjected to a charge-discharge test at 100° C. and a current density of 0.13 mAcm$^{-2}$. The test result is indicated in the graph in FIG. 9. It is found from FIG. 9 that charge and discharge are feasible even with a so-called bulk-type all-solid secondary battery formed by pressing.

Example 4

A positive electrode active material, $LiNiO_2$—$Li_2SO_4$, was obtained in the same manner as in Example 1 except that $LiNiO_2$ (Toshima Manufacturing Co., Ltd.) and $Li_2SO_4 \cdot H_2O$ (produced by Wako Pure Chemical Industries, Ltd.) were used and the treatment time of mechanical milling was changed to 50 hours.

Figure 10:
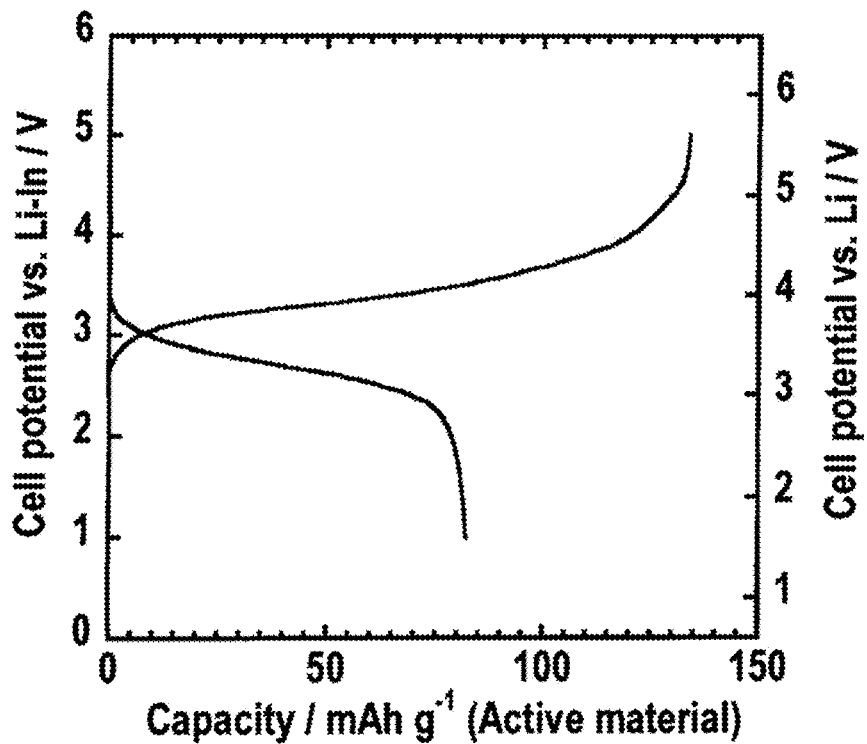
FIG. 10 indicates a graph indicating the result of the charge-discharge test of a cell of Example 4.

A battery cell obtained in the same manner as in Example 2 except that the above positive electrode active material was used was subjected to the charge-discharge test. The test result is indicated in the graph in FIG. 10. It is found from FIG. 10 that charge and discharge is also feasible with $LiNiO_2$—$Li_2SO_4$.

Example 5

A positive electrode active material, $LiNi_{1/3}Mn_{1/3}Co_{1/3}O_2$—$Li_2SO_4$ was obtained in the same manner as in Example 1 except that $LiNi_{1/3}Mn_{1/3}Co_{1/3}O_2$ (produced by Toda Kogyo Corp.) and $Li_2SO_4 \cdot H_2O$ (produced by Wako Pure Chemical Industries, Ltd.) were used and the treatment time of mechanical milling was changed to 50 hours.

Figure 11:
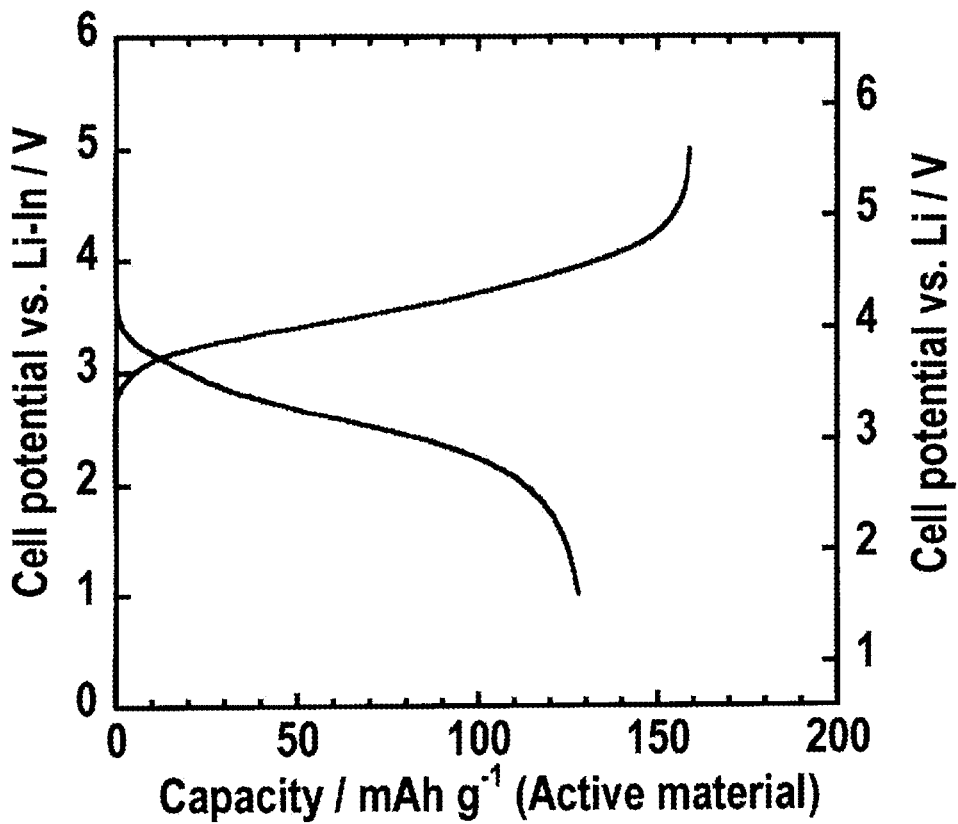
FIG. 11 indicates a graph indicating the result of the charge-discharge test of a cell of Example 5.

A battery cell obtained in the same manner as in Example 2 except that the above positive electrode active material was used was subjected to the charge-discharge test. The test result is indicated in the graph in FIG. 11. It is found from FIG. 11 that charge and discharge is also feasible with $Li_{1/3}Mn_{1/3}Co_{1/3}O_2$—$Li_2SO_4$.

Example 6

Five types of positive electrode active materials, $LiCoO_2$—$Li_2SO_4$, were obtained in the same manner as in Example 1 except that the molar ratio (x:1-x) between $LiCoO_2$ and $Li_2SO_4$ was changed to 00:0, 90:10, 80:20, 70:30 and 60:40 and the treatment time of mechanical milling was changed to 50 hours.

Figure 12:
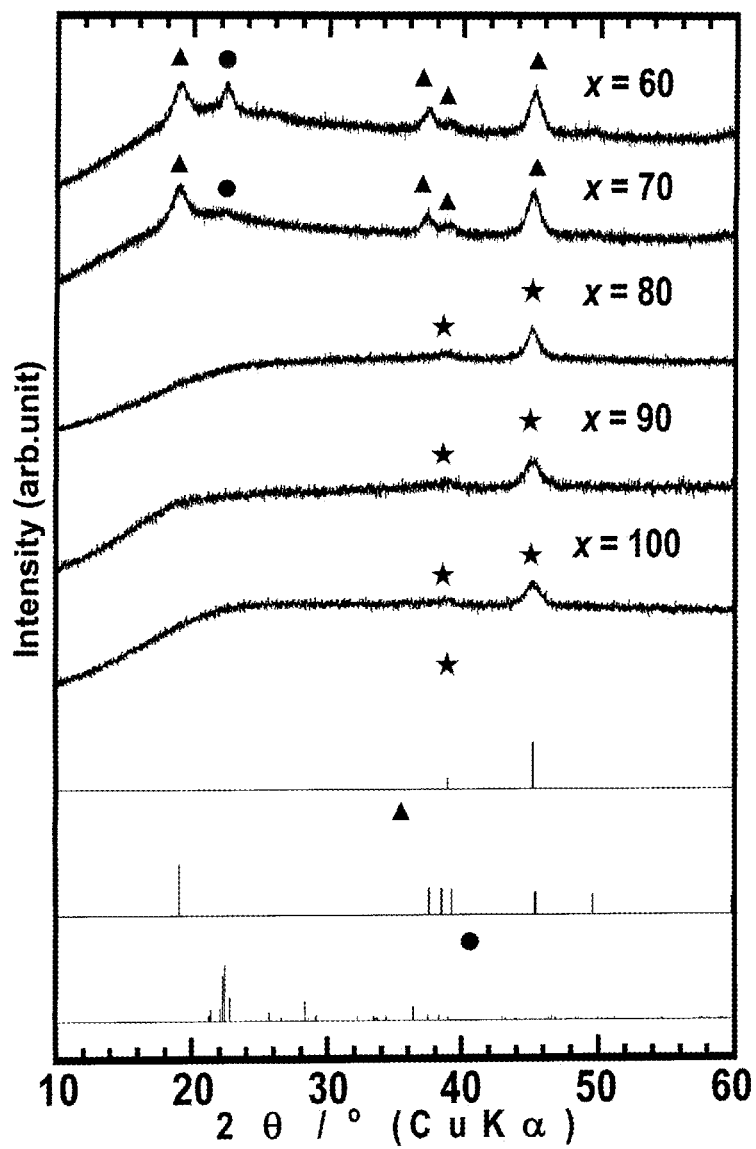
FIG. 12 indicates XRD patterns of a positive electrode active material of Example 6.

The positive electrode active materials were measured for XRD patterns in the same manner as in Example 1, which are indicated in FIG. 12. FIG. 12 also indicates XRD patterns of cubic $LiCoO_2$, hexagonal $LiCoO_2$, $Li_3PO_4$ and $Li_2SO_4$. It is found from FIG. 12 that peaks corresponding to $LiCoO_2$ are broadened and thus the positive electrode active materials are in an amorphous state. Particularly, it is found that all 2θ peaks observed have half-value widths of 0.5 or more.

Figure 13:
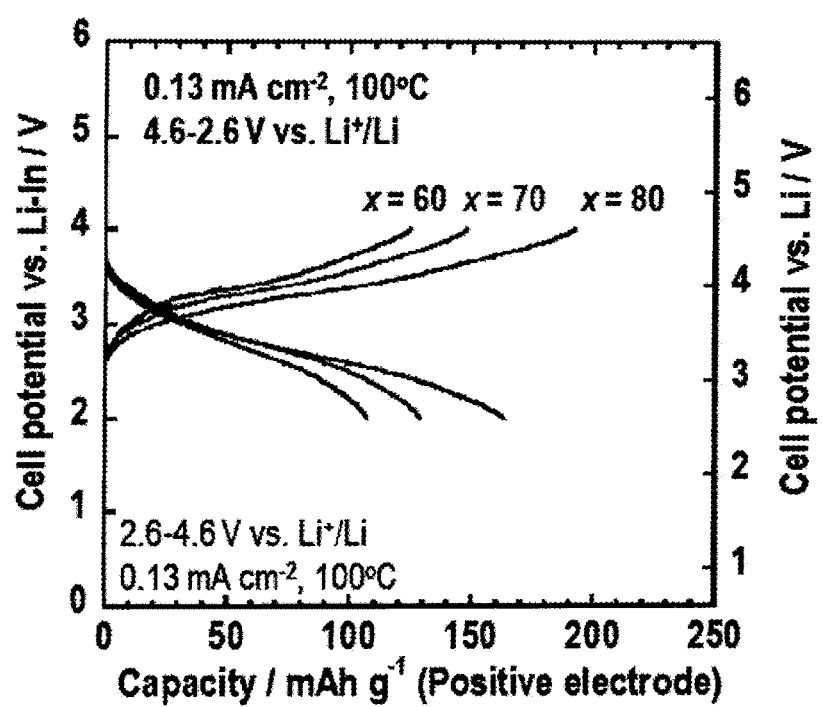
FIG. 13 indicates a graph indicating the result of the charge-discharge test of a cell of Example 6.

A battery cell obtained in the same manner as in Example 2 except that the above positive electrode active material was used was subjected to the charge-discharge test. The test result is indicated in the graph in FIG. 13. It is found from FIG. 13 that charge and discharge is also feasible even when the proportion between $LiCoO_2$ and $Li_2SO_4$ is varied.

Example 7

Three types of positive electrode active materials, $LiCoO_2$—$Li_2SO_4$, were obtained in the same manner as in Example 1 except that the molar ratio between $LiCoO_2$ and $Li_2SO_4$ was changed to 80:20 and the treatment time of mechanical milling was changed to 1 hour, 10 hours and 50 hours.

Figure 14:
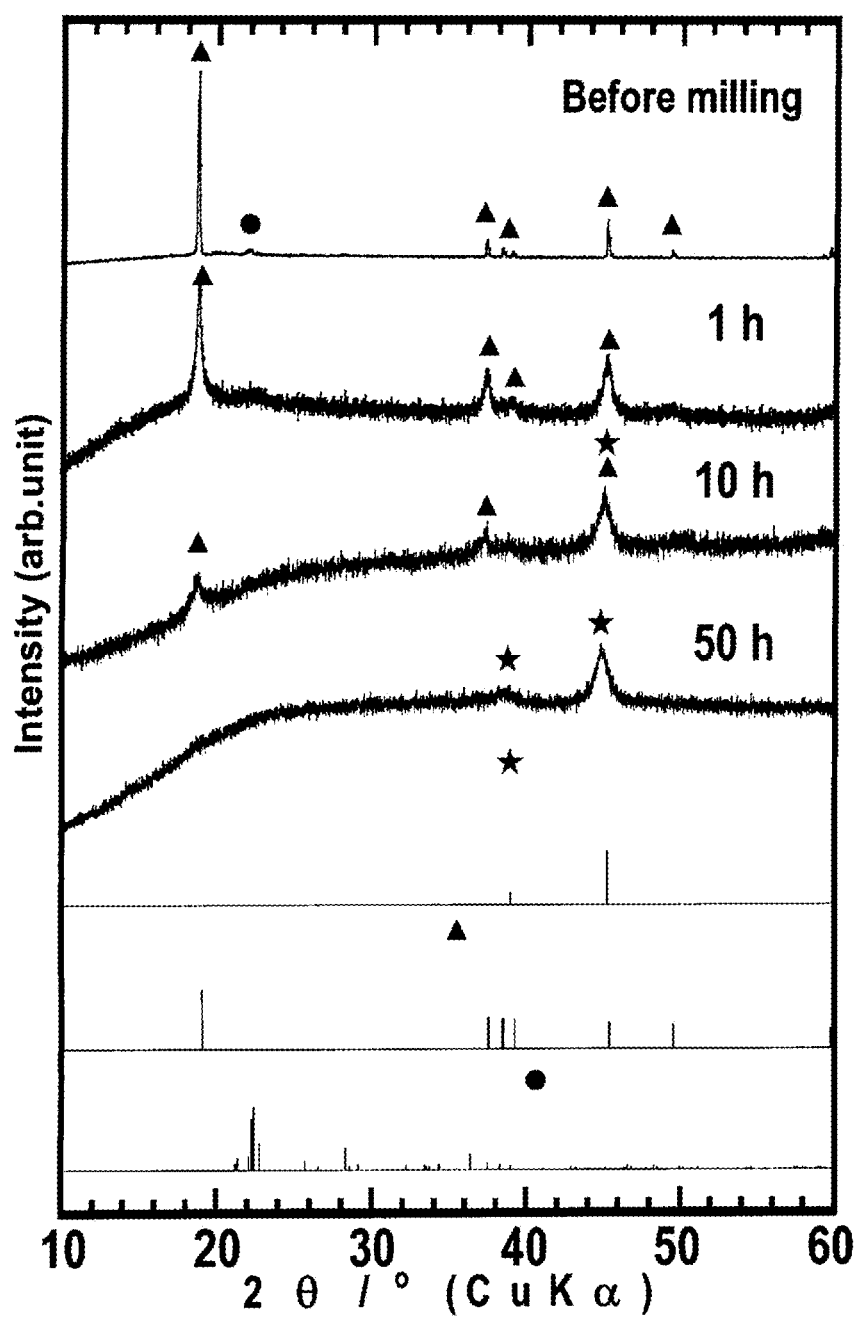
FIG. 14 indicates XRD patterns of a positive electrode active material of Example 7.

The positive electrode active materials were measured for XRD patterns in the same manner as in Example 1, which are indicated in FIG. 14. FIG. 14 also indicates XRD patterns of the mixture before mechanical milling, cubic $LiCoO_2$, hexagonal $LiCoO_2$, $Li_3PO_4$ and $Li_2SO_4$. It is found from FIG. 14 that the peaks corresponding $LiCoO_2$ are further broadened as the treatment time extends and the positive electrode active material is converted to an amorphous state.

Figure 15:
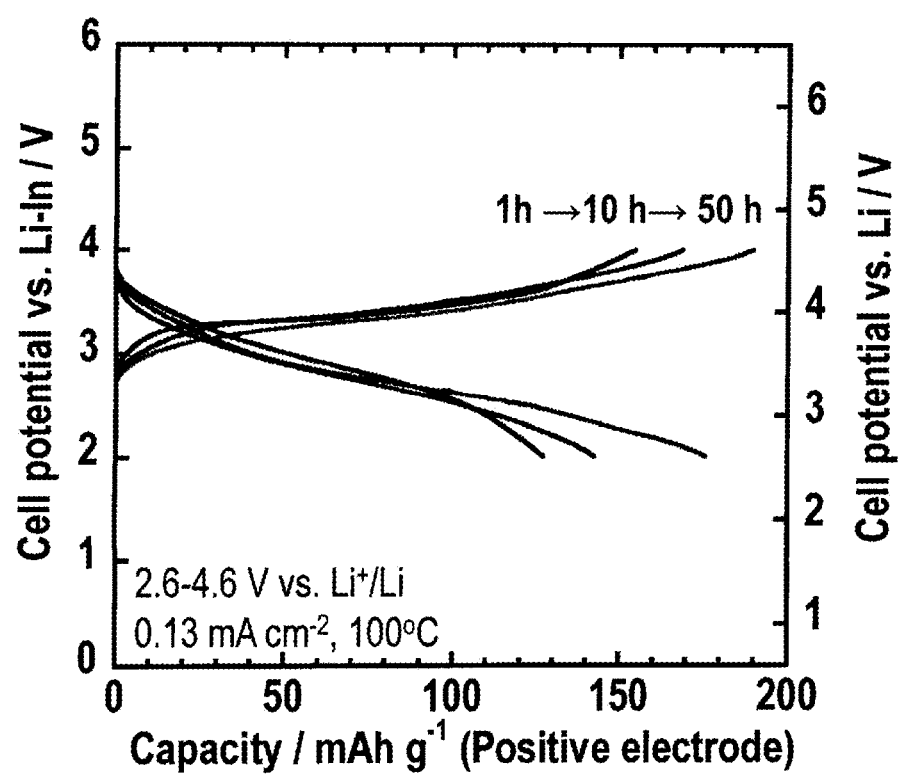
FIG. 15 indicates a graph indicating the result of the charge-discharge test of a cell of Example 7.

A battery cell obtained in the same manner as in Example 2 except that the above positive electrode active material was used was subjected to the charge-discharge test. The test result is indicated in the graph in FIG. 15. It is found from FIG. 15 that the charge-discharge capacity increases as the treatment time extends.

Example 8

Positive electrode active materials, $LiCoO_2$—$Li_2MnO_3$—$Li_2SO_4$, were obtained in the same manner as in Example 1 except that the molar ratio 80-x:x between $LiCoO_2$ (produced by Nippon Chemical Industrial Co., Ltd.) and $Li_2MnO_3$ (produced by Toshima Manufacturing Co., Ltd.) was changed to 40:40 or 60:20, the molar ratio between the sum of $LiCoO_2$ and $Li_2MnO_3$ and $Li_2SO_4$ was changed to 80:20 and the treatment time of mechanical milling was changed to 50 hours.

Figure 16:
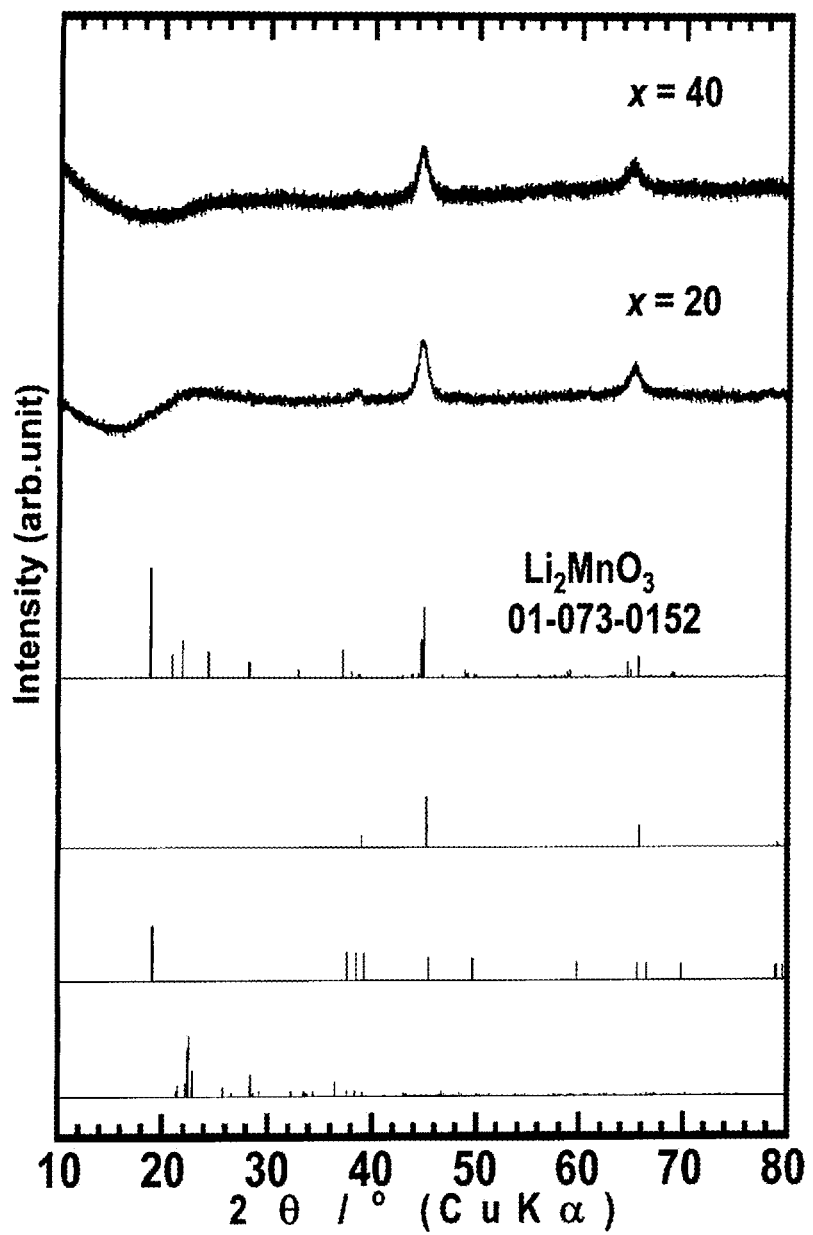
FIG. 16 indicates XRD patterns of a positive electrode active material of Example 8.

The positive electrode active materials were measured for XRD patterns in the same manner as in Example 1, which are indicated in FIG. 16. FIG. 16 also indicates XRD patterns of $Li_2MnO_3$, cubic $LiCoO_2$, hexagonal $LiCoO_2$ and $Li_2SO_4$. It is found from FIG. 16 that the peaks corresponding to $LiCoO_2$ are broadened and thus the positive electrode active materials are in an amorphous state. Particularly, it is found that all 2θ peaks observed have half-value widths of 0.5 or more.

Figure 17:
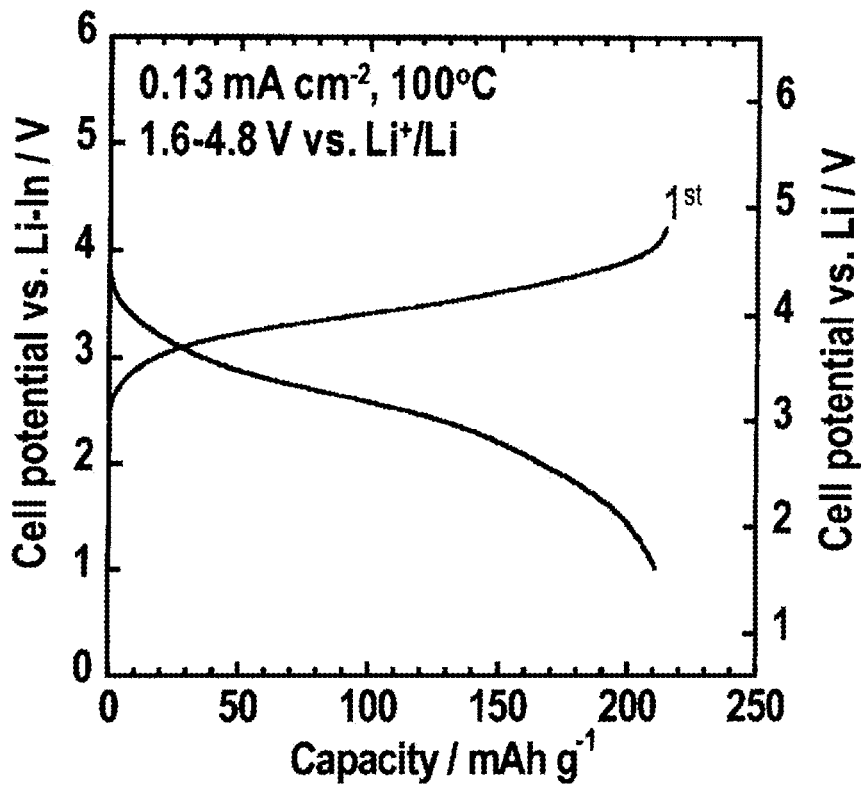
FIG. 17 indicates a graph indicating the result of the charge-discharge test of a cell of Example 8.
Figure 18:
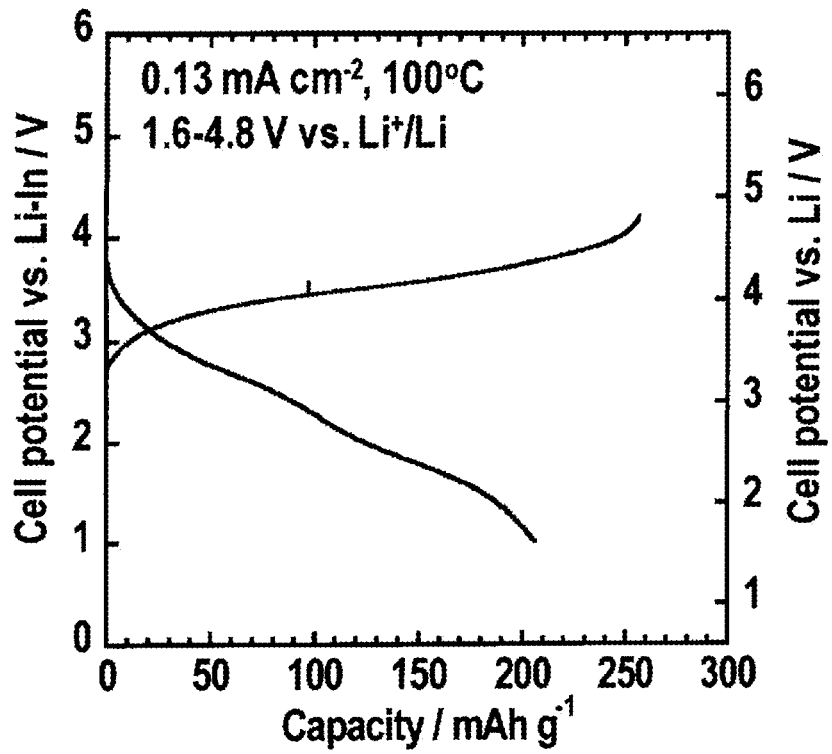
FIG. 18 indicates a graph indicating the result of the charge-discharge test of a cell of Example 8.

A battery cell obtained in the same manner as in Example 2 except that the above positive electrode active material was used was subjected to the charge-discharge test. The test result is indicated in the graphs in FIG. 17 (x=20) and FIG. 18 (x=40). It is found from FIGS. 17 and 18 that charge and discharge is also feasible with $LiCoO_2$—$Li_2MnO_3$—$Li_2SO_4$.

Example 9

Positive electrode active materials, $LiCoO_2$—$Li_2TiO_3$—$Li_2SO_4$, were obtained in the same manner as in Example 1 except that the molar ratio 80-x:x between $LiCoO_2$ (produced by Nippon Chemical Industrial Co., Ltd.) and $Li_2TiO_3$ (produced by Wako Pure Chemical Industries, Ltd.) was changed to 40:40 or 60:20, the molar ratio between the sum of $LiCoO_2$ and $Li_2TiO_3$ and $Li_2SO_4$ was changed to 80:20 and the treatment time of mechanical milling was changed to 50 hours.

Figure 19:
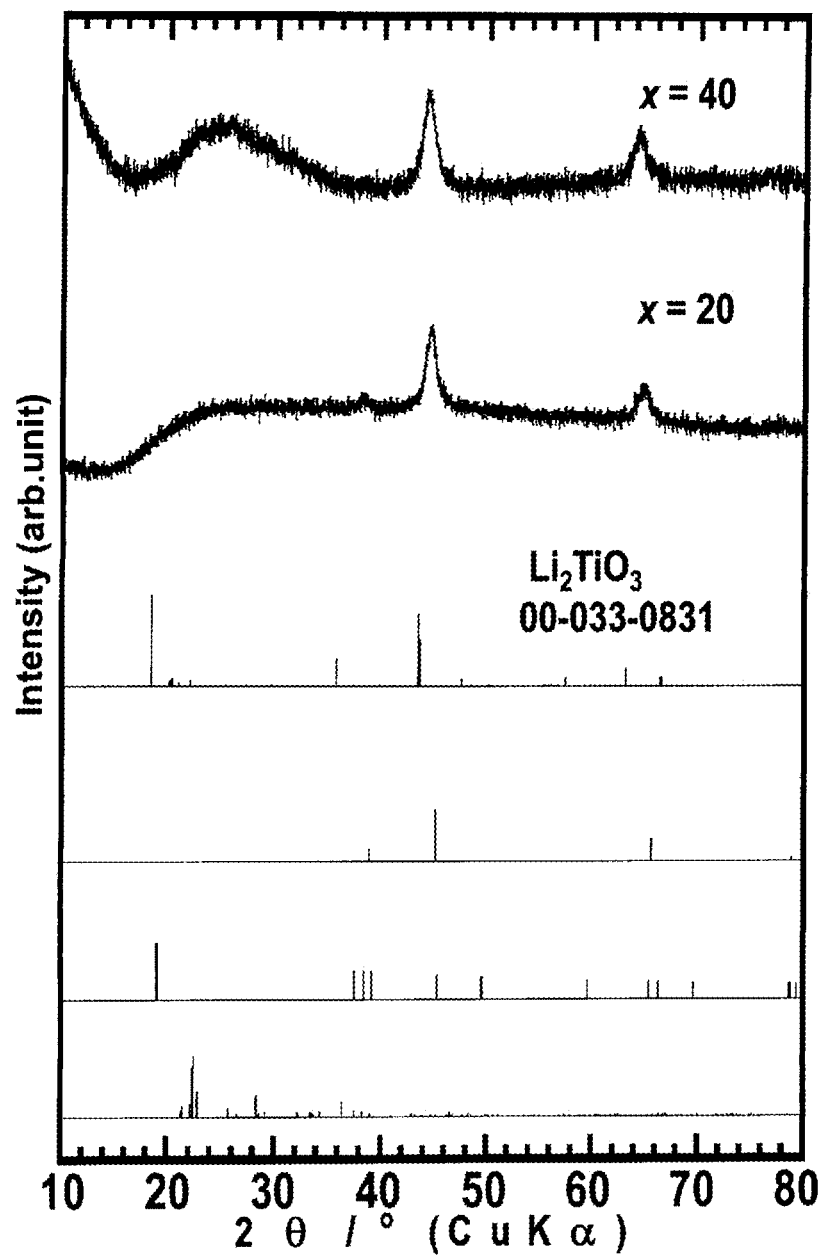
FIG. 19 indicates XRD patterns of a positive electrode active material of Example 9.

The positive electrode active materials were measured for XRD patterns in the same manner as in Example 1, which are indicated in FIG. 19. FIG. 19 also indicates XRD patterns of $Li_2TiO_3$, cubic $LiCoO_2$, hexagonal $LiCoO_2$ and $Li_2SO_4$. It is found from FIG. 19 that the peaks corresponding to $LiCoO_2$ are broadened and thus the positive electrode active materials are in an amorphous state. Particularly, it is found that all 2θ peaks observed have half-value widths of 0.5 or more.

Figure 20:
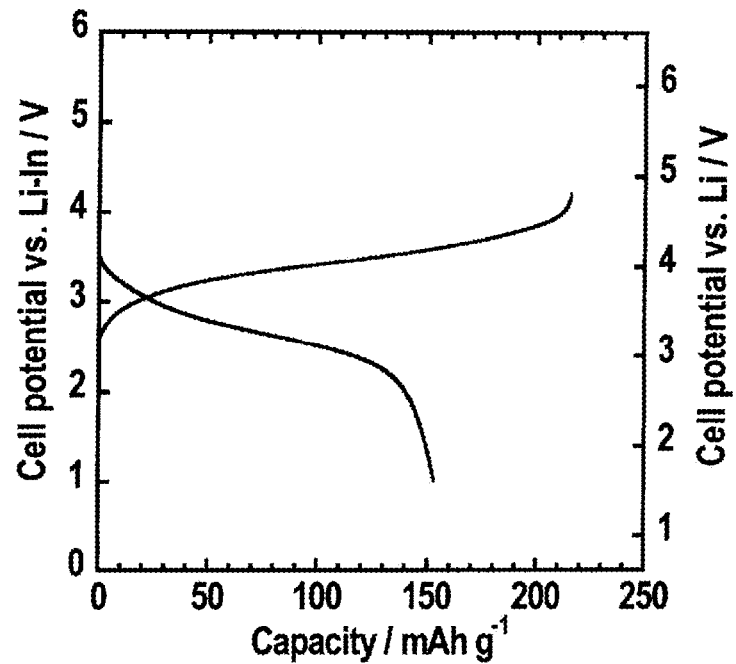
FIG. 20 indicates a graph indicating the result of the charge-discharge test of a cell of Example 9.

A battery cell obtained in the same manner as in Example 2 except that the above positive electrode active material was used was subjected to the charge-discharge test. The test result is indicated in the graph in FIG. 20 (x=20). It is found from FIG. 20 that charge and discharge is also feasible with $LiCoO_2$—$Li_2TiO_3$—$Li_2SO_4$.

Example 10

$Li_2CO_3$ (produced by Nippon Chemical Industrial Co., Ltd.), $TiO_2$ (produced by Wako Pure Chemical Industries, Ltd.) and $Mn_2O_3$ (Kojundo Chemical Laboratory Co., Ltd.) were mixed and the obtained mixture was sintered in air at 700° C. for 2 hours. Pellets were obtained from the obtained sintered material. The pellets were sintered in air at 950° C. for 96 hours to obtain crystalline $Li_{1.2}Ti_{0.4}Mn_{0.4}O_2$. $Li_{1.2}Ti_{0.4}Mn_{0.4}O_2$ and $Li_2SO_4$ obtained by dehydration of $Li_2SO_4 \cdot H_2O$ (produced by Wako Pure Chemical Industries, Ltd.) by heating in an Ar atmosphere at 300° C. for 3 hours were weighed so as to be in the molar ratios of 7:3 and 8:2 and mixed in a mortar. The obtained mixtures were subjected to mechanical milling in the same manner as in Example 1 to obtain positive electrode active materials. It should be noted that in the treatment in the present Example, the number of balls was changed to 50 and the treatment time was changed to 50 hours.

Figure 21:
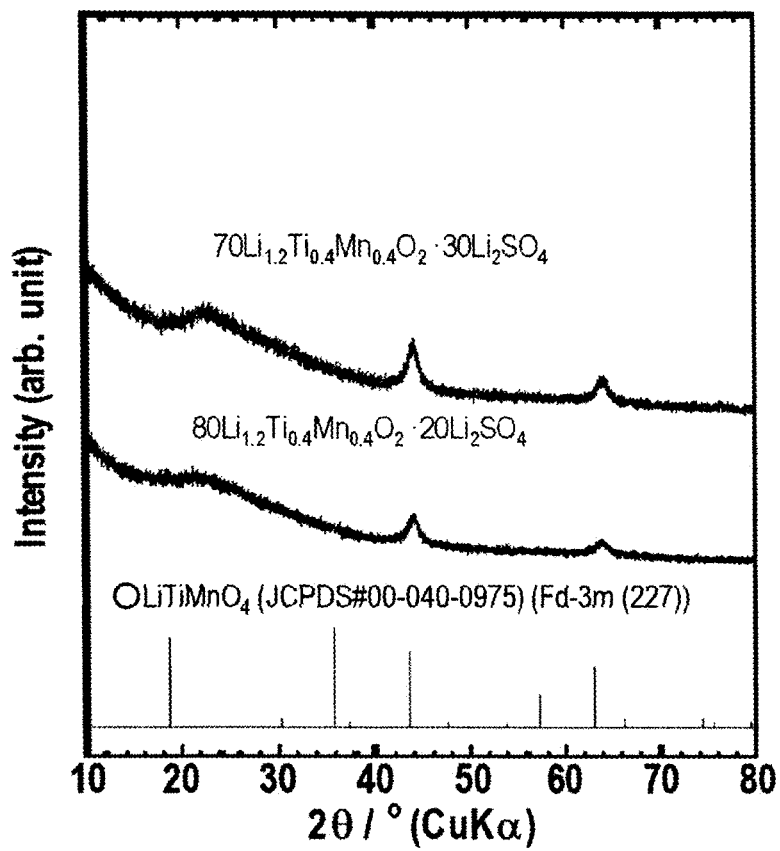
FIG. 21 indicates XRD patterns of a positive electrode active material of Example 10.

The positive electrode active materials were measured for XRD patterns in the same manner as in Example 1, which are indicated in FIG. 21. FIG. 21 also indicates the XRD pattern of $LiTiMnO_2$ according to the published data. It is found from FIG. 21 that the peaks corresponding to $LiTiMnO_2$ are broadened and thus the positive electrode active materials are in an amorphous state. Particularly, it is found that all 2θ peaks observed have half-value widths of 0.5 or more.

Figure 22:
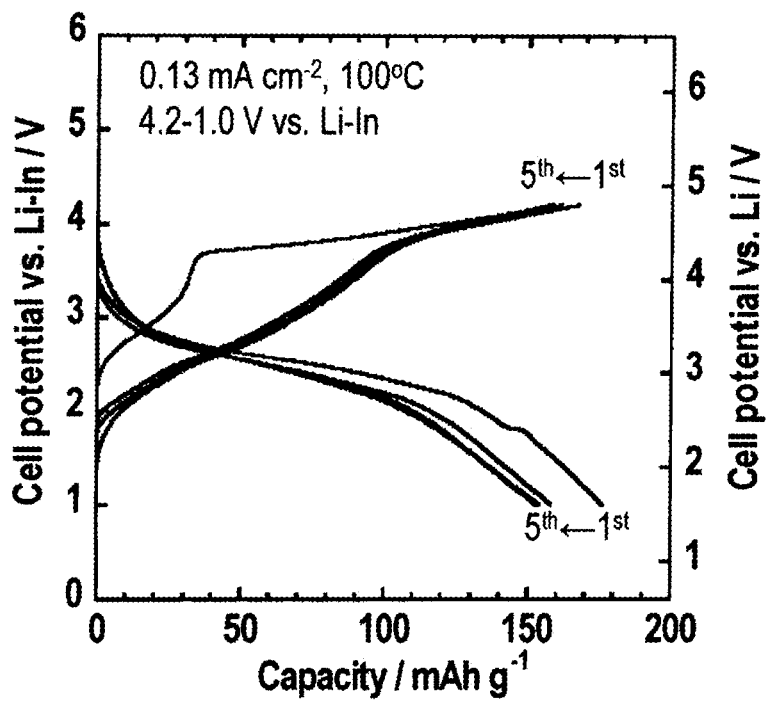
FIG. 22 indicates a graph indicating the result of the charge-discharge test of a cell of Example 10.
Figure 23:
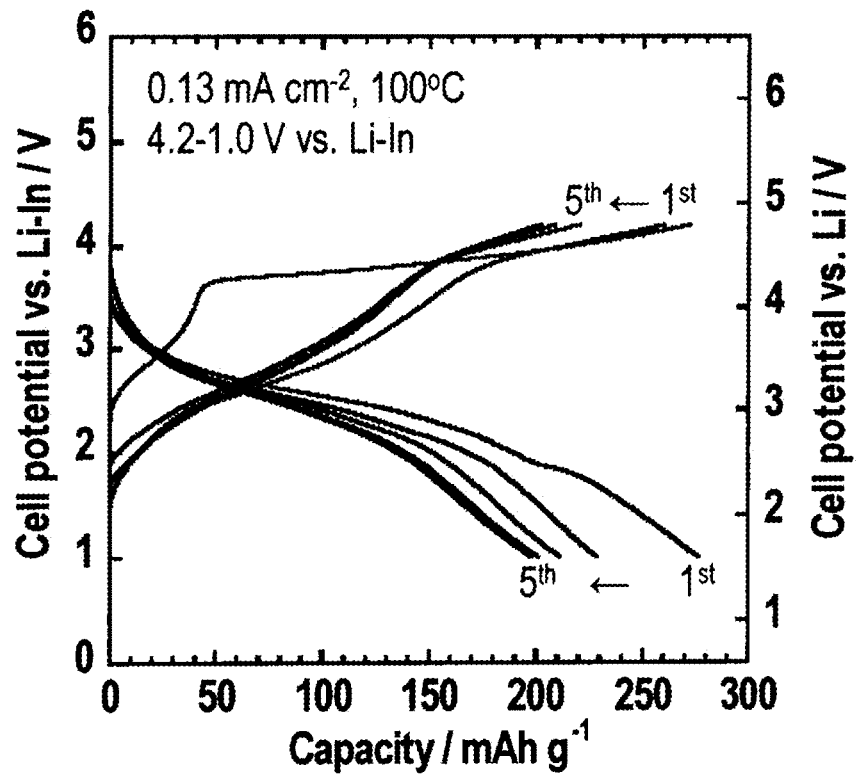
FIG. 23 indicates a graph indicating the result of the charge-discharge test of a cell of Example 10.

Battery cells obtained in the same manner as in Example 2 except that the above positive electrode active materials were used, the solid electrolyte layer was replaced by one indicated below and the collector on the side of the solid electrolyte layer was replaced by a collector made of Cu were subjected to the charge-discharge test. The test results are indicated in the graphs in FIG. 22 (molar ratio 7:3) and FIG. 23 (molar ratio 8:2). It is found from FIGS. 22 and 23 that charge and discharge are feasible with $Li_{1.2}Ti_{0.4}Mn_{0.4}O_2$—$Li_2SO_4$. It is also found that the capacity reduction due to repeated charge and discharge is relatively low.

The solid electrolyte used was $90Li_3BO_3 \cdot 10Li_2SO_4$ obtained in the same manner as in Example 1 except that $Li_2CO_3$ was not used and the molar ratio between $Li_3BO_3$ and $Li_2SO_4$ was changed to 9:1.

Example 11

Positive electrode active materials, $LiCoO_2$—$Li_2SO_4$—$LiNO_3$, were obtained in the same manner as in Example 1 except that $LiCoO_2$ (produced by Nippon Chemical Industrial Co., Ltd.), $Li_2SO_4 \cdot H_2O$ (produced by Wako Pure Chemical Industries, Ltd.) and $LiNO_3$ (produced by Wako Pure Chemical Industries, Ltd.) were used (the molar ratios between $LiCoO_2$, $Li_2SO_4 \cdot H_2O$ and $LiNO_3$ were 80:15:5 and 70:20:10), the treatment time of mechanical milling was changed to 50 hours and the number of balls was changed to 67.

Figure 24:
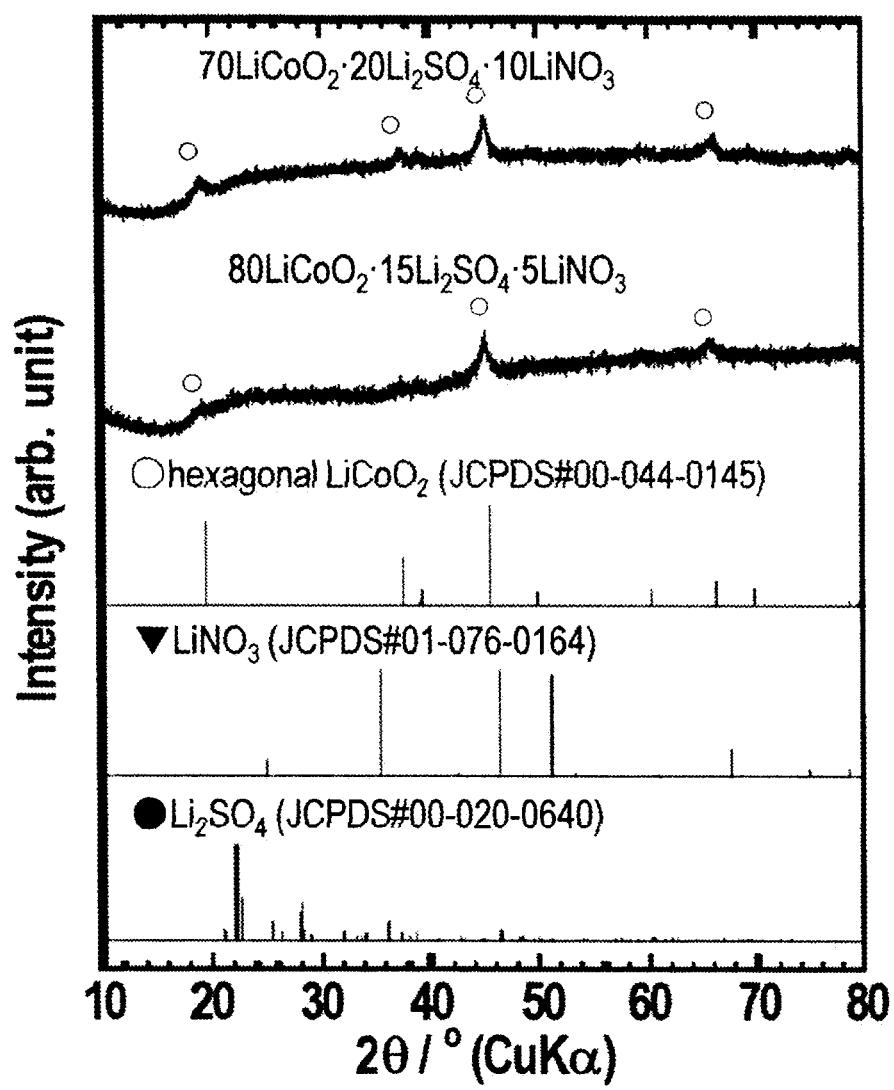
FIG. 24 indicates XRD patterns of a positive electrode active material of Example 11.

The positive electrode active materials were measured for XRD patterns in the same manner as in Example 1, which are indicated in FIG. 24. FIG. 24 also indicates XRD patterns of hexagonal $LiCoO_2$, $LiNO_3$ and $Li_2SO_4$. It is found from FIG. 24 that the peaks corresponding to $LiCoO_2$ are broadened and thus the positive electrode active materials are in an amorphous state. Particularly, it is found that all 2θ peaks observed have half-value widths of 0.5 or more.

Figure 25:
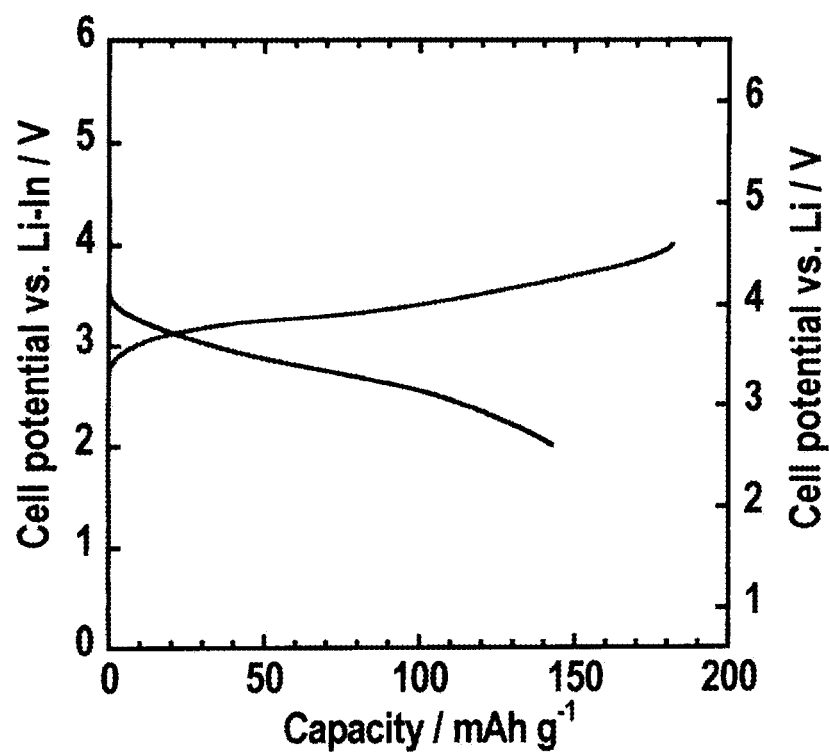
FIG. 25 indicates a graph indicating the result of the charge-discharge test of a cell of Example 11.

Battery cells obtained in the same manner as in Example 2 except that the above positive electrode active materials were used, the solid electrolyte layer was replaced by the solid electrolyte layer of Example 10 and the collector on the side of the solid electrolyte layer was replaced by a collector made of Cu were subjected to the charge-discharge test. The test results are indicated in the graph in FIG. 25 (molar ratio 80:15:5). It is found from FIG. 25 that charge and discharge are feasible with $LiCoO_2$—$Li_2SO_4$—$LiNO_3$.

What is claimed is:

1. An amorphous oxide-based positive electrode active material being a production material of a positive electrode for an all-solid secondary battery, comprising an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom, except for the oxygen atom not constituting the ionic species,
wherein said amorphous oxide-based positive electrode active material exhibits such an amorphous state that all the 2θ peaks observed in an XRD pattern have half-value widths of 0.5 or more.

2. The amorphous oxide-based positive electrode active material according to claim 1, wherein the amorphous oxide-based positive electrode active material is a production material of a positive electrode for an all-solid secondary battery, and wherein:
the amorphous oxide-based positive electrode active material
(i) comprises an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom, not constituting the ionic species;
(ii) contains at least an amorphous phase; and
(iii) a production material of a positive electrode with a thickness of 20 μm or more.

3. The amorphous oxide-based positive electrode active material according to claim 1, which comprises an alkali metal selected from Li and Na; a second metal selected from Co, Ni, Mn, Fe, Cr, V, Cu, Ti, Zn, Zr, Nb, Mo, Ru and Sn; an ionic species selected from phosphate ion, sulfate ion, borate ion, silicate ion, aluminate ion, germanate ion, nitrate ion, carbonate ion and halide ion; and an oxygen atom, not constituting the ionic species; is in an amorphous state; and is a production material of a positive electrode with a thickness of 20 μm or more for an all-solid secondary battery.

4. The amorphous oxide-based positive electrode active material according to claim 1, comprising an amorphous phase and a crystalline phase.

5. The amorphous oxide-based positive electrode active material according to claim 1, comprising components derived from an alkali metal oxide and an alkali metal salt, wherein the alkali metal oxide is selected from the group consisting of lithium-based compounds of $LiCoO_2$, $LiNiO_2$, $LiMnO_2$, $Li_2MnO_3$, $Li(Ni, Co, Mn)O_2$, $Li_2TiO_3$, $LiFeO_2$, $LiCrO_2$, $Li_2CuO_2$, $LiCuO_2$, $LiMoO_2$, $Li_2RuO_3$, $Li_3NbO_4$, $Li_3V_2(PO_4)_3$, $LiMn_2O_4$ and $Li(Ni, Mn)O_4$ and sodium-based compounds of $NaCoO_2$, $NaNiO_2$, $NaMnO_2$, $Na_2MnO_3$, $Na(Ni, Co, Mn)O_2$, $NaFeO_2$, $Na_2TiO_3$, $NaCrO_2$, $Na_2CuO_2$, $NaCuO_2$, $NaMoO_2$, $Na_2RuO_3$, $Na_3NbO_4$, $Na_3V_2(PO_4)_3$, $NaMn_2O_4$ and $Na(Ni, Mn)O_4$, and the alkali metal salt is selected from
$A_xB_yO_z$, wherein A is Li or Na; B is selected from P, S, B, C, Si, Al, Ge and N; x is 1 or more; y is 1 or more; z is 1 or more; and x, y and z are stoichiometrically possible values, and
AX, wherein A is Li or Na; and X is selected from F, Cl, Br and I.

6. The amorphous oxide-based positive electrode active material according to claim 5, wherein the component derived from the alkali metal oxide and the component derived from the alkali metal salt exist in the amorphous oxide-based positive electrode active material at a molar ratio of 1:9 to 9:1.

7. The amorphous oxide-based positive electrode active material according to claim 1, comprising components derived from $LiCoO_2$ and $Li_3PO_4$ and/or $Li_2SO_4$.

8. A positive electrode with a thickness of 20 µm or more, comprising the amorphous oxide-based positive electrode active material according to claim 1.

9. An all-solid secondary battery comprising at least the positive electrode according to claim 8, a negative electrode and a solid electrolyte layer positioned between the positive electrode and the negative electrode.

10. A method for producing the amorphous oxide-based positive electrode active material according to claim 1, wherein the amorphous oxide-based positive electrode active material is obtained by mixing raw materials thereof by mechanical milling.

\* \* \* \* \*

UNITED STATES PATENT AND TRADEMARK OFFICE
CERTIFICATE OF CORRECTION

| | | |
|---|---|---|
| PATENT NO. | : 11,349,123 B2 | Page 1 of 1 |
| APPLICATION NO. | : 16/089275 | |
| DATED | : May 31, 2022 | |
| INVENTOR(S) | : Hayashi et al. | |

It is certified that error appears in the above-identified patent and that said Letters Patent is hereby corrected as shown below:

In the Claims

Claim 1, Column 14, Lines 4-5, delete "except for the oxygen atom"

Signed and Sealed this
Second Day of August, 2022

Katherine Kelly Vidal
*Director of the United States Patent and Trademark Office*